United States Patent
Bhat et al.

(10) Patent No.: US 9,990,747 B1
(45) Date of Patent: Jun. 5, 2018

(54) SYSTEM AND METHOD FOR SELECTING AND HIGHLIGHTING ELEMENTS OF A GRAPHICAL REPRESENTATION OF DATA WITH RESPECT TO ONE OR MORE VARIABLES

(71) Applicant: Polaris Wireless, Inc., Mountain View, CA (US)

(72) Inventors: Mitul Bhat, Sunnyvale, CA (US); Pratik Dhebri, San Jose, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days. days.

(21) Appl. No.: 15/132,441

(22) Filed: Apr. 19, 2016

(51) Int. Cl.
*G06T 11/20* (2006.01)
*G06F 17/30* (2006.01)

(52) U.S. Cl.
CPC ...... *G06T 11/206* (2013.01); *G06F 17/30572* (2013.01)

(58) Field of Classification Search
None
See application file for complete search history.

(56) References Cited

U.S. PATENT DOCUMENTS

| | | | |
|---|---|---|---|
| 2014/0043325 A1 | 2/2014 | Ruble et al. | |
| 2014/0053091 A1* | 2/2014 | Hou | G06F 17/30389 715/769 |
| 2015/0015504 A1* | 1/2015 | Lee | G06F 3/04845 345/173 |
| 2016/0174081 A1 | 6/2016 | Lau | |

OTHER PUBLICATIONS

Office action dated Jul. 12, 2017, U.S. Appl. No. 15/132,588.
Office action dated Dec. 6, 2017, U.S. Appl. No. 15/132,441.
USPTO, Office action, U.S. Appl. No. 15/132,379, dated Apr. 2, 2018.
USPTO, Office action, U.S. Appl. No. 15/132,588, dated Mar. 22, 2018.

* cited by examiner

*Primary Examiner* — Xiao M. Wu
*Assistant Examiner* — Mohammad H Akhavannik
(74) *Attorney, Agent, or Firm* — McGeary Cukor LLC; Kenneth Ottesen; Jason Paul DeMont

(57) ABSTRACT

A system and method for selecting and highlighting elements of a graphical representation of data. A disclosed video display system is capable of providing, as part of a displayed image, i) a collection of data points in a first display area of a display and ii) a first graphical representation in a second display area, wherein the graphical elements in the first graphical representation are dependent on the collection of data points. The video display system can provide, for example, a scatter plot as the collection of data points and a pie chart as the first graphical representation, and can superimpose a selection window on the scatter plot, in order to enable a user to specify or select a subset of the data points. The pie chart graphically represents, for example, a breakdown of members by organization, wherein each slice in the pie chart corresponds to a different organization.

22 Claims, 20 Drawing Sheets

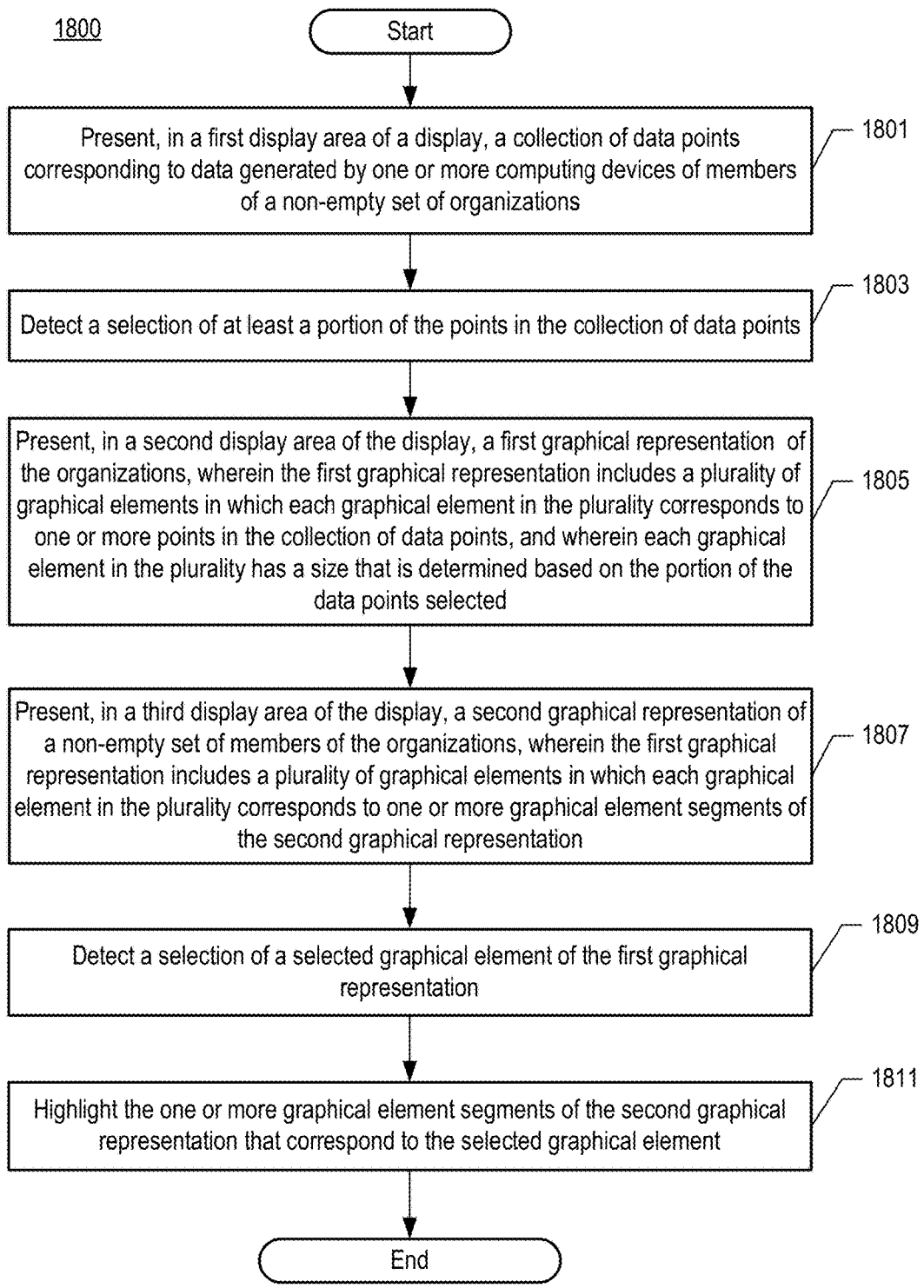

SYSTEM AND METHOD FOR SELECTING AND HIGHLIGHTING ELEMENTS OF A GRAPHICAL REPRESENTATION OF DATA WITH RESPECT TO ONE OR MORE VARIABLES

CROSS REFERENCE TO RELATED APPLICATIONS

This application is related to "System and method for graphical representation of spatial data," U.S. application Ser. No. 15/132,379, and "System and method for coordinating session replay of spatiotemporal data and presentation of a graphical representation of said data," U.S. application Ser. No. 15/132,588, both filed on the same day as the present application and incorporated by reference herein.

FIELD OF THE INVENTION

The present invention relates to information technology in general, and, more particularly, to representing and handling data graphically on a video display system.

BACKGROUND OF THE INVENTION

A video display system is capable of presenting video images to a user. A typical video display system comprises i) a data-processing system such as a personal computer, ii) a video display, and iii) various user interface devices such as a keyboard and a pointing device. The data-processing system can be either a general-purpose computer or a special-purpose computer that comprises a processor, memory, and input and output interfaces that constitute a user interface. The data-processing system executes video display software that performs various functions on media content, such as editing, based on the commands received through the user interface devices, and provides the processed media content to the video display. The video display can be a display apparatus such as a monitor that receives a video signal from the data-processing system and creates a visual image of the signal for the user.

Video display systems are often used as a component of or as an adjunct to a broader system or application. A surveillance system, for example, enables law enforcement to request the current location, or a past location, of a particular wireless terminal. In this scenario, the wireless terminal might be under surveillance with respect to a person of interest who has been using the terminal or who is otherwise associated with the terminal. A location estimation system, whose function is to estimate the positions of wireless terminals, generates spatiotemporal data in regard to the wireless terminal being surveilled. The location estimation system then makes the data available to the surveillance system and the video display system, which can track the person of interest, display the data to a display system user, and so forth.

A challenge with at least some video display systems in the prior art is to take large amounts of data and to reduce it to what a user needs. In present-day telecommunications systems, for example, it is possible to generate tremendous amounts of spatiotemporal data for millions of wireless terminals within just a single coverage area of a wireless service provider. In this situation, it is often unrealistic to expect a user of a video display system to be able to pare down the data without some type of assistance, especially in surveillance scenarios that are time-critical. Indeed, there are certain scenarios, such as those that are driven by the exigent demands of finding a terrorist member of an organization, which make an effective presentation of relevant data to a user particularly important.

What is needed is an improved representation of data without at least some of the disadvantages in the prior art.

SUMMARY OF THE INVENTION

The present invention enables a system and method for selecting and highlighting elements of a graphical representation of data with respect to one or more variables. A video display system disclosed herein is capable of presenting a layout of graphics objects as part of a displayed image. The system provides in the displayed image i) a collection of data points in a first display area of a display and ii) a first graphical representation in a second display area of the display, wherein the graphical elements in the first graphical representation are dependent on the collection of data points.

The video display system of the illustrative embodiment of the present invention features i) a scatter plot as the collection of data points and ii) a pie chart as the first graphical representation. The pie chart, which can be dynamically created by a processor of the video display system, can graphically represent a breakdown of members by organization, wherein each slice in the pie chart corresponds to a different organization. For example, the organizations might be wireless service providers in a given region, and the members might be subscribers to the services provided by the service providers.

The scatter plot, which also can be dynamically created by the processor, comprises data points, wherein each data point is representative of at least two variables. For example, each data point on the scatter plot might correspond to a particular data communication transacted by a particular wireless terminal of a particular terminal user and at a particular time; for that data point, the scatter plot might show the number of data packets transmitted for that data communication. Some of the wireless terminals and their users (i.e., members) might be affiliated with a first wireless service provider (i.e., an organization), while some might be affiliated with a second wireless service provider, and so on.

The video display system can superimpose a selection window on the scatter plot, which window can be adjusted by a user in order to specify or select a subset of the data points on the scatter plot. The user can adjust the selection window by varying i) the relative dimensions of the window and ii) its position within the field of data points. In regard to the selection window, the video display system can present the pie chart such that each slice in the pie chart represents a different organization (e.g., service provider, etc.), wherein the size of each slice can vary dynamically depending on the data points appearing, or not appearing, within the selection window specified by the user.

In accordance with the illustrative embodiment, a scatter plot represents a collection of data points and a pie chart represents a first graphical representation. It will be clear to those who are skilled in the art after reading this specification, however, that other types of data-point collections and graphical representations can be used and can be made to interact with each other.

An illustrative system for graphically representing data comprises: a data-processing system configured to detect a selection of at least a portion of the points in a collection of data points corresponding to data generated by one or more computing devices of members of a non-empty set of organizations, wherein each data point in the collection is representative of at least two variables; and a display configured to: a) present, in a first display area of the display, the collection of data points, and b) present, in a second display area of the display, a first graphical representation of the organizations, wherein the first graphical representation includes a plurality of graphical elements in which each graphical element in the plurality corresponds to one or more points in the collection of data points, and wherein each graphical element in the plurality has a size that is determined based on the portion of the data points selected.

An illustrative method of graphically representing data comprises: presenting, in a first display area of a display, a collection of data points corresponding to data generated by one or more computing devices of members of a non-empty set of organizations, wherein each data point in the collection is representative of at least two variables; detecting a selection of at least a portion of the data points in the collection of points; and presenting, in a second display area of the display, a first graphical representation of the organizations, wherein the first graphical representation includes a plurality of graphical elements in which each graphical element in the plurality corresponds to one or more points in the collection of data points, and wherein each graphical element in the plurality has a size that is determined based on the portion of the data points selected.

Another illustrative system for graphically representing data comprises: a data-processing system configured to detect a selection of at least a portion of the points in a collection of data points corresponding to data generated by one or more computing devices of members of a non-empty set of organizations; and a display configured to: a) present, in a first display area of the display, the collection of data points, and b) present, in a second display area of the display, a first graphical representation of the organizations, wherein the first graphical representation includes a plurality of graphical elements in which each graphical element in the plurality corresponds to one or more points in the collection of data points, and wherein each graphical element in the plurality has a size that is determined based on i) the number of members, as represented in the portion of the data points selected, of an organization that corresponds to the graphical element, in relation to ii) the total number of members, as represented in the portion of the data points selected, in the set of organizations.

Another illustrative method of graphically representing data comprises: presenting, in a first display area of a display, a collection of data points corresponding to data generated by one or more computing devices of members of a non-empty set of organizations; detecting a selection of at least a portion of the points in the collection of data points; and presenting, in a second display area of the display, a first graphical representation of the organizations, wherein the first graphical representation includes a plurality of graphical elements in which each graphical element in the plurality corresponds to one or more points in the collection of data points, and wherein each graphical element in the plurality has a size that is determined based on i) the number of members, as represented in the portion of the data points selected, of an organization that corresponds to the graphical element, in relation to ii) the total number of members, as represented in the portion of the data points selected, in the set of organizations.

BRIEF DESCRIPTION OF THE DRAWINGS

FIG. 18 depicts a flowchart of the salient processes of method 1800, performed in accordance with the illustrative embodiment and corresponding to the presentation of one or more of the graphics objects depicted in FIGS. 17a and 17b.

DETAILED DESCRIPTION

Figure 1:
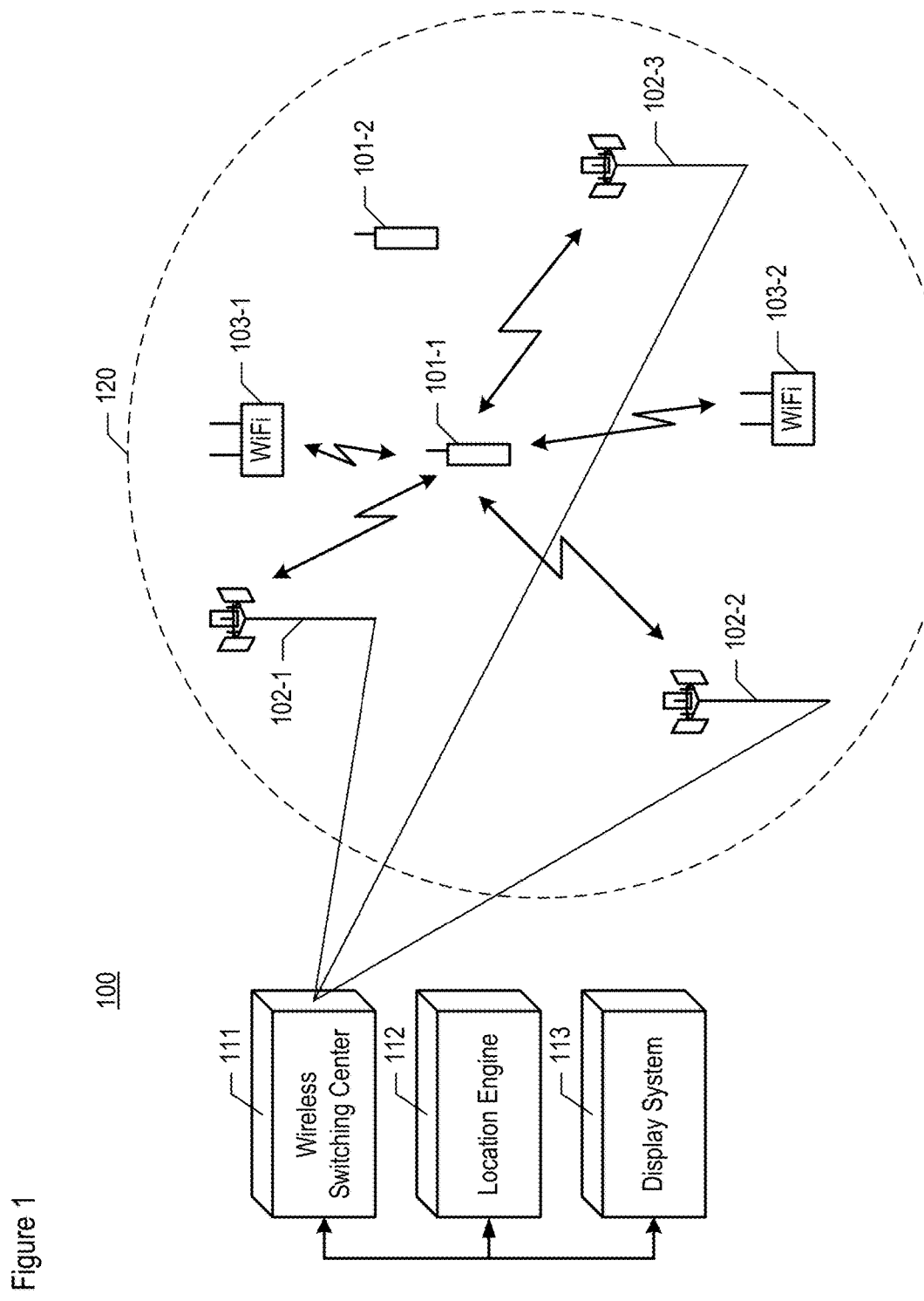
FIG. 1 depicts a diagram of the salient components of wireless telecommunications system 100 in accordance with the illustrative embodiment of the present invention.

Based on—For the purposes of this specification, the term "based on" and its inflected forms are defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Organization—For the purposes of this specification, the term "organization" and its inflected forms are defined as a business, society, association, company, firm, corporation, institution, group, consortium, conglomerate, and agency. Specific examples of an organization include without limitation: a service provider (e.g., of telecommunications services, etc.) and a terrorist organization.

Graphical representation of data—For the purposes of this specification, the term "graphical representation of data" and its inflected forms are defined as a visual display of data and statistical results, in which the data is represented by graphical elements, such as bars in a bar chart (or bar "graph"), lines in a line chart, or slices in a pie chart. In some graphical representations, each graphical element can be subdivided into one or more graphical element segments. Examples of graphical representations of data are: a) a "pie chart" (or "circle chart"), in which each slice represent a different category and slice angles (arc lengths) are proportional to the frequencies of the categories; b) a "bar chart", in which each bar represents a different category and the lengths of the bars are proportional to the frequencies of the categories; and c) a "line chart", which displays information as a series of data points connected by straight line segments.

Map—For the purposes of this specification, the term "map" and its inflected forms are defined as a diagrammatic representation of an area of land and/or water showing one or more of physical features, cities, buildings, and roads Member—For the purposes of this specification, the term "member" and its inflected forms are defined as an individual, thing, or sub-organization belonging to an organization. For example, a subscriber is a member of a wireless service provider (i.e., the organization).

Present—For the purposes of this specification, the infinitive "to present" and its inflected forms (e.g., "presenting", "presented", etc.) should be given the ordinary and customary meaning that the terms would have to a person of ordinary skill in the art at the time of the invention.

Detect—For the purposes of this specification, the infinitive "to detect" and its inflected forms (e.g., "detecting", "detected", etc.) should be given the ordinary and customary meaning that the terms would have to a person of ordinary skill in the art at the time of the invention.

Superimpose—For the purposes of this specification, the infinitive "to superimpose" and its inflected forms (e.g., "superimposing", "superimposed", etc.) should be given the ordinary and customary meaning that the terms would have to a person of ordinary skill in the art at the time of the invention.

Object—For the purposes of this specification, the term "object" and its inflected forms are defined as anything that is visible or tangible and is relatively stable in form, such as a thing, person, or matter to which thought or action is directed. A "member" is an example of an object.

Geolocation—For the purposes of this specification, the term "geolocation" and its inflected forms are defined as the assessed geographic location of an object. A geolocation can be in the form of a street address or geographic coordinates, for example and without limitation.

Marker—For the purposes of this specification, the term "marker" and its inflected forms are defined as an object used to indicate a position, place, or route. For example and without limitation, a position that is based on one or more geolocations of an object can be generated in relation to a map or other diagrammatic representation; in this case, a marker is the manifestation on the map of the generated position.

Timeline—For the purposes of this specification, the term "timeline" and its inflected forms are defined as a graphical representation of the passage of time as a line.

Scatter plot—For the purposes of this specification, the term "scatter plot" and its inflected forms are defined as a type of mathematical diagram using Cartesian coordinates to display values for typically two variables for a set of data. If the points are color-coded, the number of displayed variables can be increased to three. The data is displayed as a collection of points, each data point having the value of one variable determining the position on the horizontal axis and the value of the other variable determining the position on the vertical axis. This kind of plot is also called a "scatter chart," "scattergram," "scatter diagram," or "scatter graph."

FIG. 1 depicts a diagram of the salient components of wireless telecommunications system 100 in accordance with the illustrative embodiment of the present invention. Wireless telecommunications system 100 comprises: wireless terminals 101-1 through 101-J, wherein J is equal to 2 as depicted, cellular base stations 102-1 through 102-K, wherein K is equal to 3 as depicted, Wi-Fi base stations 103-1 through 103-L, wherein L is equal to 2 as depicted, wireless switching center 111, location engine 112, and display system 113, which are interrelated as shown. The illustrative embodiment provides wireless telecommunications service to geographic region 120, in well-known fashion, estimates the locations of wireless terminals 101-1 through 101-1 within geographic region 120 at different times, and uses those estimates in a display application (e.g., for editing, for surveillance, etc.).

In accordance with the illustrative embodiment, wireless telecommunications service is provided to wireless terminals 101-j, wherein j can have a value of between 1 and J, in accordance with the Long-Term Evolution (LTE) air-interface standard of the $3^{rd}$ Generation Partnership Project ("3GPP"). After reading this disclosure, however, it will be clear to those skilled in the art how to make and use alternative embodiments of the present invention that operate in accordance with one or more other air-interface standards (e.g., Global System Mobile "GSM," UMTS, CDMA-2000, IS-136 TDMA, IS-95 CDMA, 3G Wideband CDMA, IEEE 802.11 Wi-Fi, 802.16 WiMax, Bluetooth, etc.) in one or more frequency bands. As will be clear to those skilled in the art, a wireless terminal is also known as a "cell phone," "mobile station," "user equipment," "smartphone," "car phone," "PDA," and the like.

Wireless terminal 101-j is a computing device and comprises the hardware and software necessary to be standard-compliant and to perform the processes described below and in the accompanying figures. For example and without limitation, wireless terminal 101-j is capable of:

i. measuring one or more location-dependent traits of each of one or more electromagnetic signals (transmitted by cellular base stations 102-1 through 102-K and Wi-Fi base stations 103-1 through 103-L) and of reporting the measurements to location engine 112, and ii. transmitting one or more signals and of reporting the transmission parameters of those signals to location engine 112.

Wireless terminal 101-j is mobile and can be at any location within geographic region 120 at any time. Although wireless telecommunications system 100 comprises two wireless terminals, it will be clear to those skilled in the art, after reading this disclosure, how to make and use alternative embodiments of the present invention that comprise any number of wireless terminals.

Cellular base stations 102-1 through 102-K communicate with wireless switching center 111 via wireline and with each wireless terminal 101-j via radio in well-known fashion. As is well known to those skilled in the art, base stations are also commonly referred to by a variety of alternative names such as access points, nodes, network interfaces, and so on. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment, cellular base stations 102-1 through 102-K are terrestrial, immobile, and within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 102-1 through 102-K comprise the hardware and software necessary to be standard-compliant and to perform the processes described below and in the accompanying figures. For example and without limitation, cellular base stations 102-1 through 102-K are capable of:
  i. measuring one or more location-dependent traits of each of one of more electromagnetic signals (transmitted by wireless terminal 101-*j*) and of reporting the measurements to location engine 112, and
  ii. transmitting one or more signals and of reporting the transmission parameters of those signals to location engine 112.

Wi-Fi base stations 103-1 through 103-L communicate with wireless terminal 101-*j* via radio in well-known fashion. Wi-Fi base stations 103-1 through 103-L have a shorter range than cellular base stations 102-1 through 102-1, but have a higher bandwidth. Wi-Fi base stations 103-1 through 103-L are terrestrial, immobile, and within geographic region 120.

Wi-Fi base stations 103-1 through 103-L are capable of:
  i. measuring one or more location-dependent traits of each of one of more electromagnetic signals (transmitted by wireless terminal 101-*j*) and of reporting the measurements to location engine 112, and
  ii. transmitting one or more signals and of reporting the transmission parameters of those signals to location engine 112.

Although the illustrative embodiment comprises two WiFi base stations, it will be clear to those skilled in the art, after reading this disclosure, how to make and use alternative embodiments of the present invention that comprise any number of WiFi base stations.

Wireless switching center 111 comprises a switch that orchestrates the provisioning of telecommunications service to wireless terminal 101-*j* and the flow of information to and from location engine 112, as described below and in the accompanying figures. As is well known to those skilled in the art, wireless switching centers are also commonly referred to by other names such as mobile switching centers, mobile telephone switching offices, gateways, routers, and so on.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal.

In accordance with the illustrative embodiment, all of the base stations servicing wireless terminal 101-*j* are associated with wireless switching center 111. It will be clear to those skilled in the art, after reading this disclosure, how to make and use alternative embodiments of the present invention in which any number of base stations are associated with any number of wireless switching centers.

Location engine 112 comprises hardware and software that generates one or more estimates of the location of wireless terminal 101-*j* for a given moment in time, and can do so for multiple times and for multiple wireless terminals. There are many techniques in the prior art that can be used by location engine 112 for estimating the location of a wireless terminal. In accordance with some techniques, the location engine estimates the location of a wireless terminal, at least in part, from measurements that are reported by the wireless terminal. The reported measurements are of signals measured by the wireless terminal that are transmitted by one or more base stations through their antennas and, in some cases, by Global Positioning System (GPS) satellites. Some techniques rely on signal-strength measurements, while some other techniques rely on time-based measurements, while still some other techniques rely on other types of measurements. In any event, it will be clear to those skilled in the art how to make and use location engine 112.

Although location engine 112 as depicted in FIG. 1 as physically distinct from wireless switching center 111, it will be clear to those skilled in the art, after reading this disclosure, how to make and use alternative embodiments of the present invention in which location engine 112 is wholly or partially integrated with wireless switching center 111.

Display system 113 comprises hardware and software that uses the estimates for the locations over a period of time of wireless terminal 101-*j*—provided by location engine 112—in a location-based application, as described below and in the accompanying figures. Display system 113 can be part of an overarching system, such as a video editing system or a surveillance system (e.g., for law enforcement, etc.), in turn within or interacting with a telecommunications system (or not); alternatively, display system 113 can serve mainly or exclusively as a system for presenting data to a user. In accordance with the illustrative embodiment, display system 113 is a video display system that is a part of telecommunications system 100. In some alternative embodiments, as those who are skilled in the art will appreciate after reading this specification, display system 113 can be outside of telecommunications system 100 but still use data provided by system 100, or can use data that is unrelated to telecommunications.

In accordance with the illustrative embodiment, display system 113 communicates with location engine 112 via a local area network; however it will be clear to those skilled in the art, after reading this disclosure, how to make and use alternative embodiments of the present invention in which display system 113 communicates with one or more of the entities depicted in FIG. 1 via a different network such as, for example, the Internet, the Public Switched Telephone Network (PSTN), a wide area network, and so on.

In accordance with the illustrative embodiment, wireless switching center 111, location engine 112, and display system 113 are physically located within geographic region 120. It will be clear to those skilled in the art, however, after reading this disclosure, how to make and use alternative embodiments of the present invention in which some or all of wireless switching center 111, location engine 112, and display system 113 are physically located outside of geographic region 120.

Figure 2:
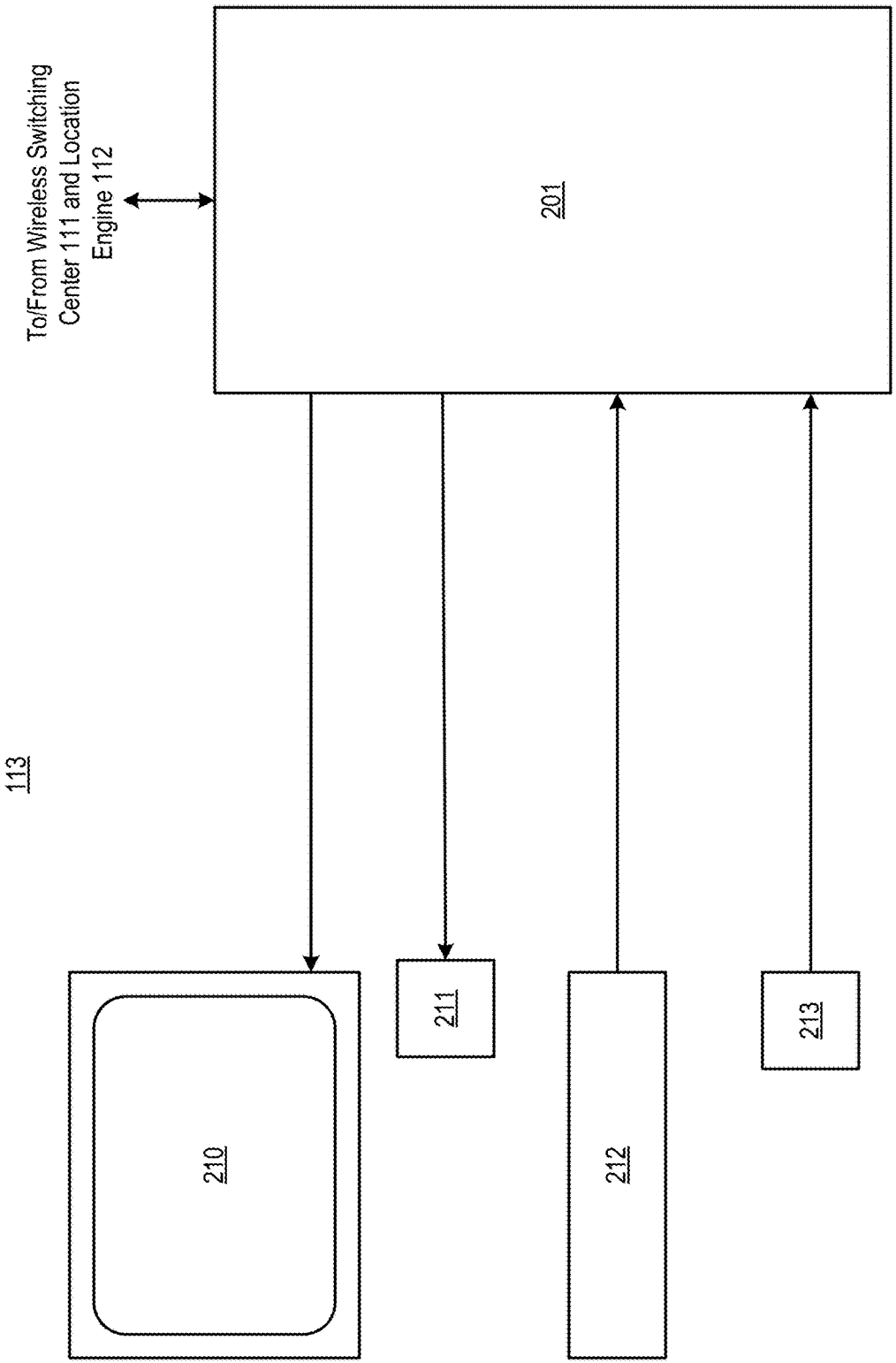
FIG. 2 depicts a block diagram of the salient components of display system 113 within telecommunications system 100, in accordance with the illustrative embodiment.

FIG. 2 depicts a block diagram of the salient components of display system 113 in accordance with the illustrative embodiment. Display system 113 comprises: data-processing system 201, video display 210, speaker 211, keyboard 212, and pointing device 213, interconnected as shown.

Data-processing system 201 is a general-purpose computer that comprises a processor, memory, and input and output interfaces for a user interface. Data-processing system 201 is capable of performing the tasks described below. In particular, data-processing system 201:

i. outputs a video signal to video display 210 to present and/or highlight displayed objects, and
ii. receives a keyboard signal from keyboard 212, comprising a user input control, and
iii. receives a pointing and command signal from pointing device 213, comprising a user input control, and
iv. outputs a speaker signal to speaker 211.

Data-processing system 201 provides a graphical user interface (GUI) and is capable of accepting user-level commands, including selections of graphical elements or other displayed objects, via:

i. keyboard 212, or
ii. pointing device 213, or
iii. the combination of i and ii.

Video display 210 is a display device (e.g., a monitor, etc.) as is well known in the art that receives a video signal and creates a visual image of the signal for presentation to a user. In accordance with the illustrative embodiment, display 210 receives the signals that are generated as described below and presents the visual images as described below. It will be clear to those skilled in the art, after reading this specification, how to make and use video display 210.

Speaker 211 is an electro-acoustic transducer as is well known in the art that receives a speaker signal and creates an audible sound of the signal for a user. It will be clear to those skilled in the art, after reading this specification, how to make and use speaker 211.

Keyboard 212 is a character input device as is well known in the art that receives input from a user and transmits keyboard signals representing that input. It will be clear to those skilled in the art, after reading this specification, how to make and use keyboard 212.

Pointing device 213 is a spatial input device (e.g., a mouse, a joystick, a touchpad, a stylus, etc.) as is well known in the art that receives spatial and command (e.g., button, wheel, etc.) input from a user and that transmits pointing and command signals representing that input. It will be clear to those skilled in the art, after reading this specification, how to make and use pointing device 213.

In accordance with the illustrative embodiment, display system 213 performs at least some of the tasks described below. As those who are skilled in the art will appreciate after reading this specification, however, a different system can perform said tasks.

Figure 3:
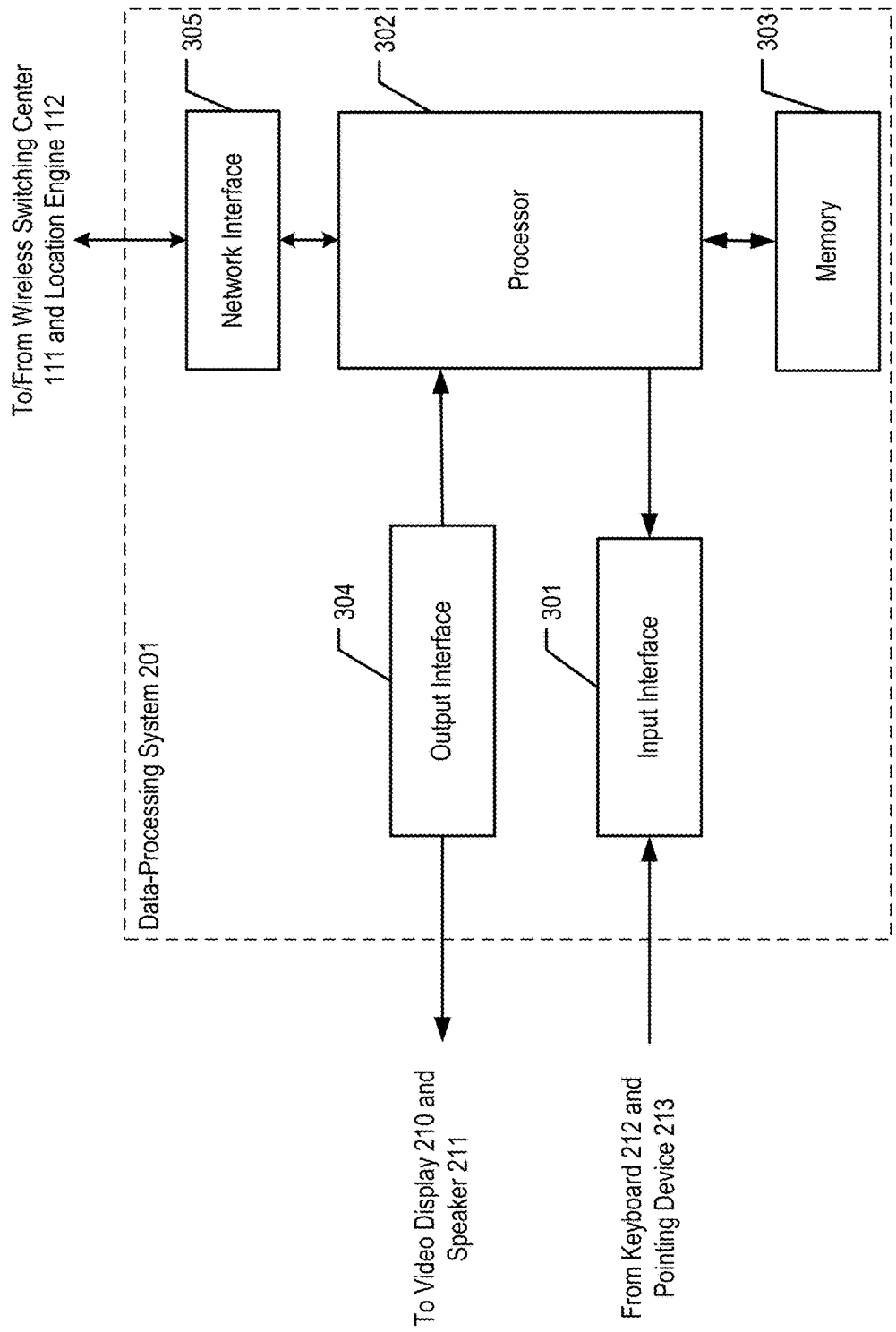
FIG. 3 depicts a block diagram of the salient components of data-processing system 201 within display system 113, in accordance with the illustrative embodiment of the present invention.

FIG. 3 depicts a block diagram of the salient components of data-processing system 201, in accordance with the illustrative embodiment of the present invention. Data-processing system 201 is a computing device and comprises input interface 301, processor 302, memory 303, output interface 304, and network interface 305 interconnected as shown. In some embodiments, data-processing system 201 is a personal computer.

Input interface 301 receives signals from keyboard 212 and pointing device 213, and forwards the information encoded in the signals to processor 302. It will be clear to those skilled in the art, after reading this specification, how to make and use input interface 301.

Processor 302 is a general-purpose processor that is capable of: receiving information from input interface 301; reading data from and writing data into memory 303; executing at least some of the tasks described below; and transmitting information to output interface 304. In some alternative embodiments of the present invention, processor 302 might be a special-purpose processor. In either case, it will be clear to those skilled in the art, after reading this specification, how to make and use processor 302.

Memory 303 stores data and executable instructions, is a combination of volatile and non-volatile memory, and is non-transitory. Memory 303 is further described below and with respect to FIG. 4. It will be clear to those skilled in the art, after reading this specification, how to make and use memory 303.

Output interface 304 receives information from processor 302, and outputs signals that encode this information to video display 210 and speaker 211. In some embodiments, output interface 304 can be built into a video card, which can be used to offload at least some of the processing from processor 302. It will be clear to those skilled in the art, after reading this specification, how to make and use output interface 304.

Network interface 305 receives information from wireless switching center 111 and/or location engine 112. The information can include spatial-temporal data such as one or more series of geolocations of each of a plurality of objects (e.g., wireless terminals, other types of computing devices, etc.) and one or more series of times when the objects in the plurality were at their respective geolocations. The information can further include information about one or more organizations (e.g., wireless service providers, terrorist groups, etc.) and information about objects (e.g., people, subscribers, members, vehicles, equipment, wireless terminals, goods, etc.) affiliated with or belonging to each organization. It will be clear to those skilled in the art, after reading this specification, how to make and use network interface 305.

Figure 4:
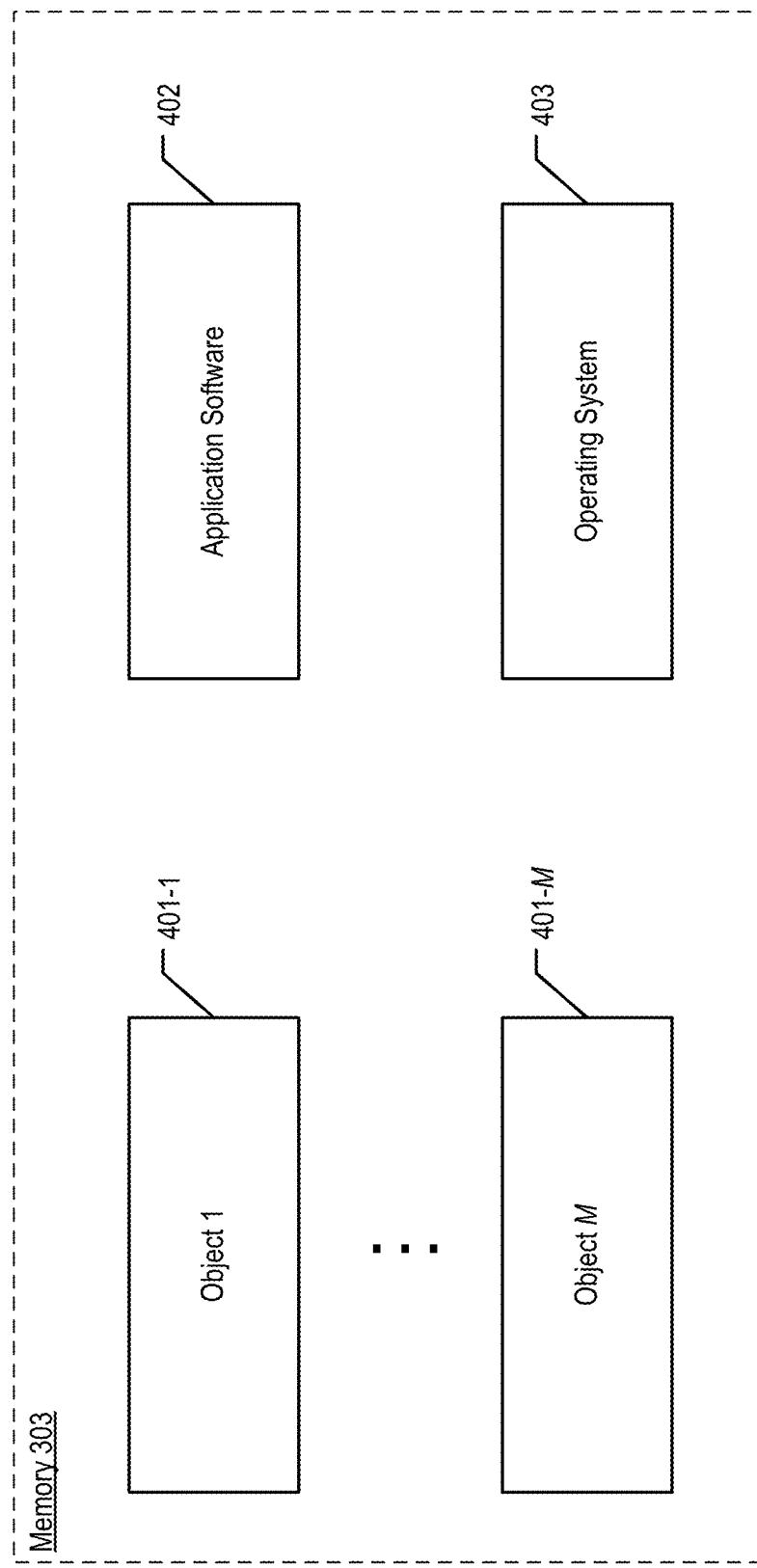
FIG. 4 depicts a diagram of the salient information stored in memory 303, which comprises the files relating to M objects of interest, namely object files 401-1 through 401-M that represent objects 1 through M, respectively, application software 402, and operating system 403.

FIG. 4 depicts a diagram of the salient information stored in memory 303, which comprises the files relating to M objects of interest, namely object files 401-1 through 401-M that represent objects 1 through M, respectively, application software 402, and operating system 403. As those who are skilled in the art will appreciate after reading this specification, a different type of file structure can be used than depicted.

The object files associated with each object of interest can comprise i) data that are representative of one or more series of geolocations of the object, ii) data that are representative of one or more series of times representing when the object was at the respective geolocations, wherein both types of data can be received from location engine 112 and stored. The object files can also comprise information about the object itself other than its geolocation, including the organization that the object is affiliated with or a member of, and information about the organization, for one or more organizations.

In accordance with the illustrative embodiment, Object 1 and Object 2 correspond to wireless terminals 101-1 and 101-2, respectively. As those who are skilled in the art will appreciate after reading this specification, however, Objects 1 through M can correspond to any type of object that can be tracked and in any combination of types of objects.

Application software 402 is the software portion of the display system, the executable tasks of which are described below. Operating system 403 is an operating system that performs input/output, file and memory management, and all of the other functions normally associated with operating systems. It will be clear to those skilled in the art how to make and use operating system 403.

Figure 5:
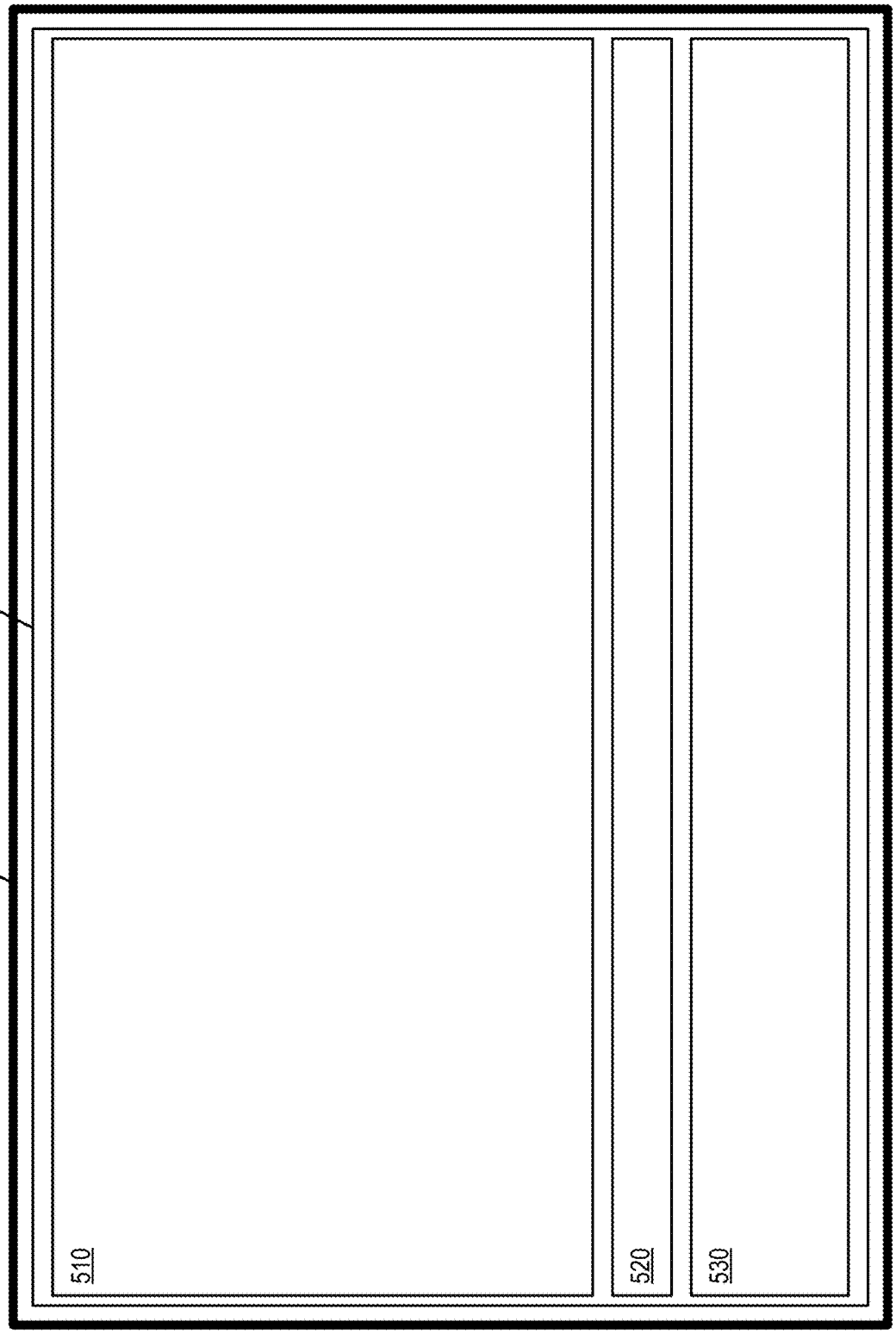
FIG. 5 depicts a displayed image on video display 210.

FIG. 5 depicts an image on video display 210 in accordance with the illustrative embodiment. Image 550, which constitutes an image of a graphical user interface provided by data-processing system 201, comprises: graphic pane 510, playback command pane 520, and timeline pane 530. Graphic pane 510 is a graphical display space that displays text and other graphical objects such as diagrams (e.g., scatter plots, etc.), diagrammatic representations (e.g., maps, etc.), and graphical representations (e.g., pie charts, bar charts, line charts, etc.). Playback command pane 520 is a graphical display space that displays one or more playback command controls. Timeline pane 530 is a graphical display space that displays one or more timelines. The panes are further described below, beginning with FIG. 6.

The panes as depicted in FIG. 5 are in a particular arrangement. As those who are skilled in the art will appreciate after reading this specification, however, the panes can be situated in a different arrangement than depicted (e.g., different shapes, different relative positions, different direction of alignment, etc.).

Figure 6A:
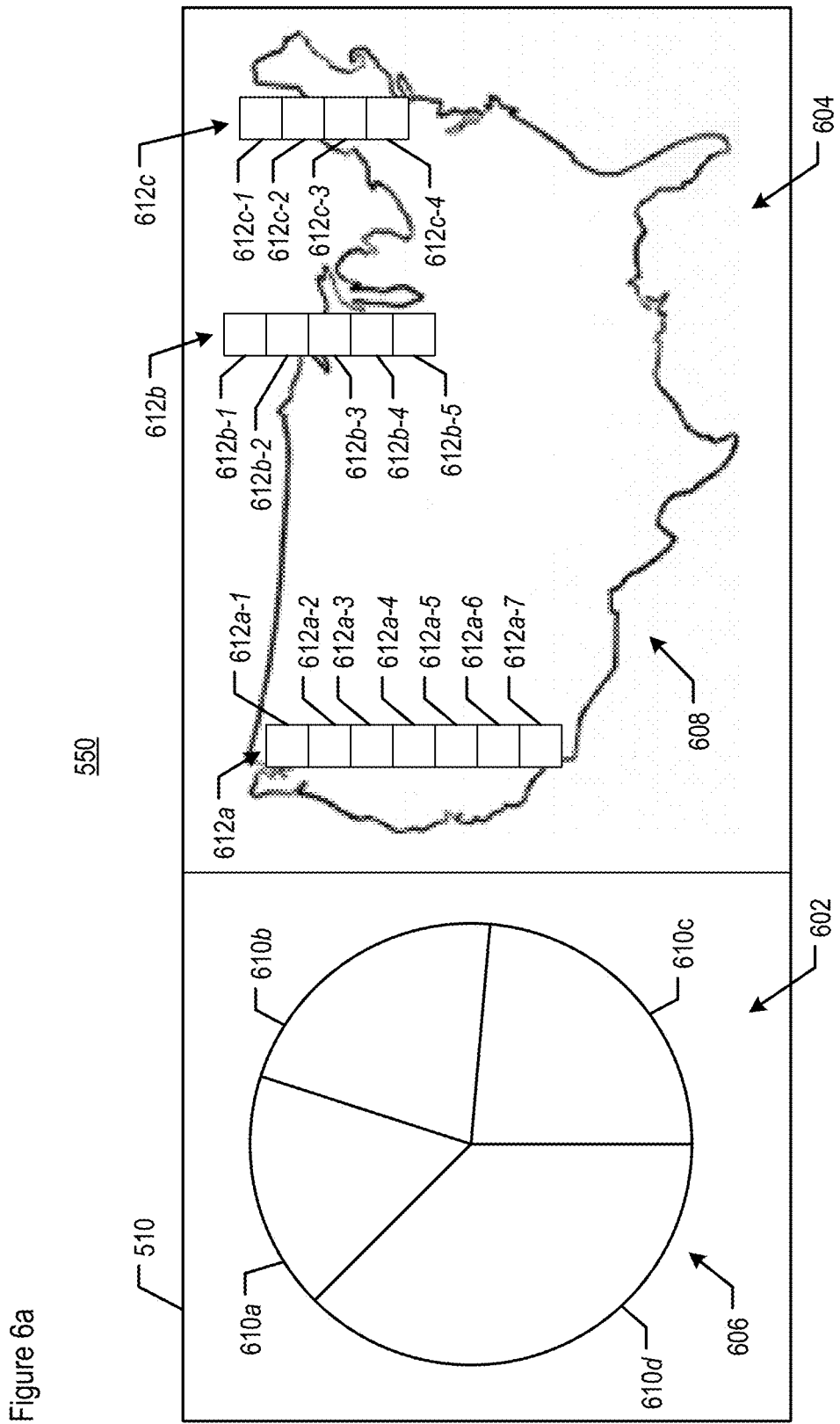
FIGS. 6a and 6b depict a first of various examples of graphic pane 510, playback command pane 520, and timeline pane 530, as part of displayed image 550.

FIG. 6a depicts a first of various examples of graphic pane 510, playback command pane 520, and timeline pane 530, as part of displayed image 550. Depending on the example being depicted, some of the panes are presented as part of the displayed image, while some of the panes are presented or are optional. The panes as depicted in FIG. 6a and other figures are in particular arrangements. As those who are skilled in the art will appreciate after reading this specification, however, the text and graphic objects displayed with the panes in each example can be situated in a different arrangement than depicted for the example and can be combined in different ways across the examples provided. For example and without limitation, in various embodiments of the present invention, a bar chart or a line chart can take the place of a pie chart, a pie chart or a line chart can take the place of a bar chart, segments of a graphical representation can be individual slices instead of individual bars, or vice-versa, and so on.

FIG. 6a depicts a first layout of graphics objects, as part of displayed image 550. Displayed image 550 provides i) pie chart 606, a graphical representation, in a first display area 602 and ii) map 608, a diagrammatic representation, in a second display area 604 within display pane 510. Pie chart 606, which can be dynamically created by processor 302, graphically represents a breakdown of members by organization or, more specifically in the example, a breakdown of subscribers by wireless service provider (e.g., Sprint Corporation, T-Mobile, AT&T Mobility, Verizon Wireless, etc.). In this example, each "slice" (or "wedge") 610a-d in the pie chart corresponds to a different service provider. Display area 602 can also contain other information, such as text identifying each service provider and the numeric proportion in percent of each slice to the overall pie chart, which can be updated as the pie chart itself gets updated or the slices themselves get updated.

As those who are skilled in the art will appreciate after reading this specification, a different type of graphical representation than pie chart 606 (e.g., pie chart, line chart, etc.) can be dynamically created and used, a different type of organization (e.g., other consumer business, non-profit, political, terrorist, etc.) can be represented, a group can be represented instead of an organization, and/or a different type of organization or group member can be represented.

Map 608, which can be dynamically created by processor 302, is a diagrammatic representation of at least a portion of geographic region 120. Map 608 in particular shows an outline of a geographic region (e.g., the continental United States, etc.). As those who are skilled in the art will appreciate after reading this specification, map 608 can show a different set of features than depicted, including physical features, types of roads, bodies of water, cities, buildings, labels that identify each of said features, and so on. As those who are skilled in the art will appreciate after reading this specification, a different type of diagrammatic representation than map 608 can be dynamically created and used.

Superimposed on map 608 and in the second display area 604 are elements of a bar chart, which is a graphical representation. Bars 612a-c, which can be dynamically created by processor 302, graphically represent a breakdown of subscribers by city (or local area or region) within map 608, wherein each bar corresponds to a different city. For example, as positioned on map 608, bar 612a corresponds to Los Angeles, bar 612b corresponds to Chicago, and bar 612c corresponds to New York, as the bars are presented as being relatively proximate to the positions on the map of the corresponding cities based, at least in part, on the geolocation information in the underlying data. In some alternative embodiments of the present invention, each bar can correspond to a type of municipality, place, or feature different than a city. Display area 604 can also contain other information, such as text identifying each city and the numeric proportion in percent of each bar to the set of bars, which can be updated as the bar chart itself gets updated or the bars themselves get updated. As those who are skilled in the art will appreciate after reading this specification, a different type of graphical representation than the bar chart comprising bars 612a-c can be dynamically created and used.

Each bar 612a-c contains one or more segments, such as segments 612a-1 through 612a-7, 612b-1 through 612b-5, and 612c-1 through 612c-4 in bars 612a, 612b, and 612c, respectively. In accordance with the illustrative embodiment, a different set of one or more segments superimposed on map 608 corresponds to each slice in pie chart 606. Thus, segments 612a-1, 612a-4, 612b-3, 612c-2, and 612c-3 might correspond to (i.e., be affiliated with) pie slice 610a, while segments 612a-6, 612a-7, 612c-1, and 612c-4 might correspond to pie slice 610b, for example and without limitation.

Figure 6B:
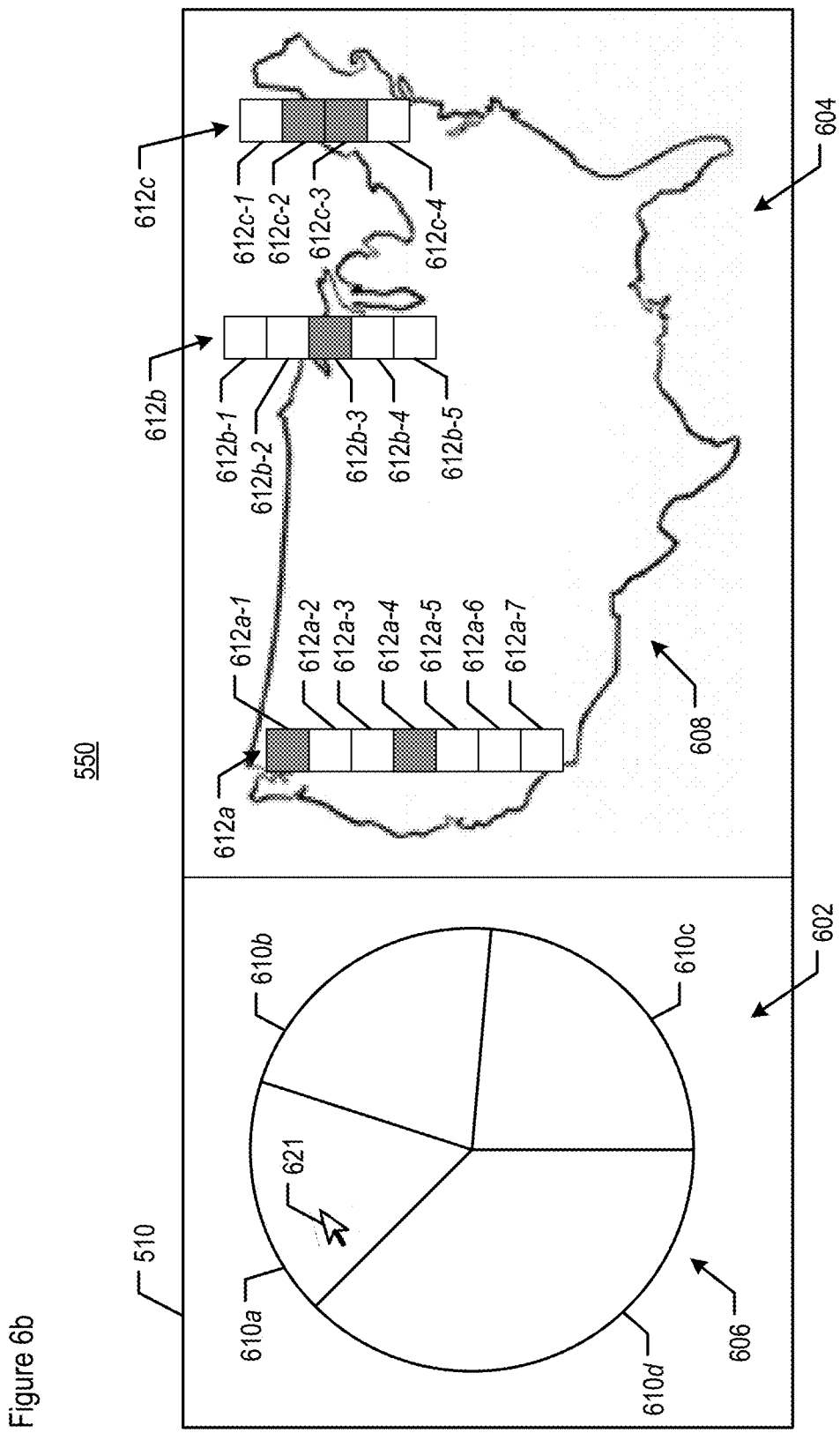

As described later, the system of the illustrative embodiment can i) detect a selection of a selected slice of pie chart 606 and, during at least some of the time when the detecting is occurring, ii) highlight the specific one or more graphical element segments of bars 612a-c that correspond to the selected slice of pie chart 606. For example, FIG. 6b depicts segments 612a-1, 612a-4, 612b-3, 612c-2, and 612c-3, which illustratively correspond to pie slice 610a as described above, being highlighted (as shown in gray) based on selection of pie slice 610a being detected, wherein the selection of the pie slice is depicted with cursor 621. Unless otherwise indicated in this specification, selection of a graphical element in general can involve hovering of a cursor over the graphical element, an actual clicking on the graphical element, or some other commonly-known technique.

Figure 7:
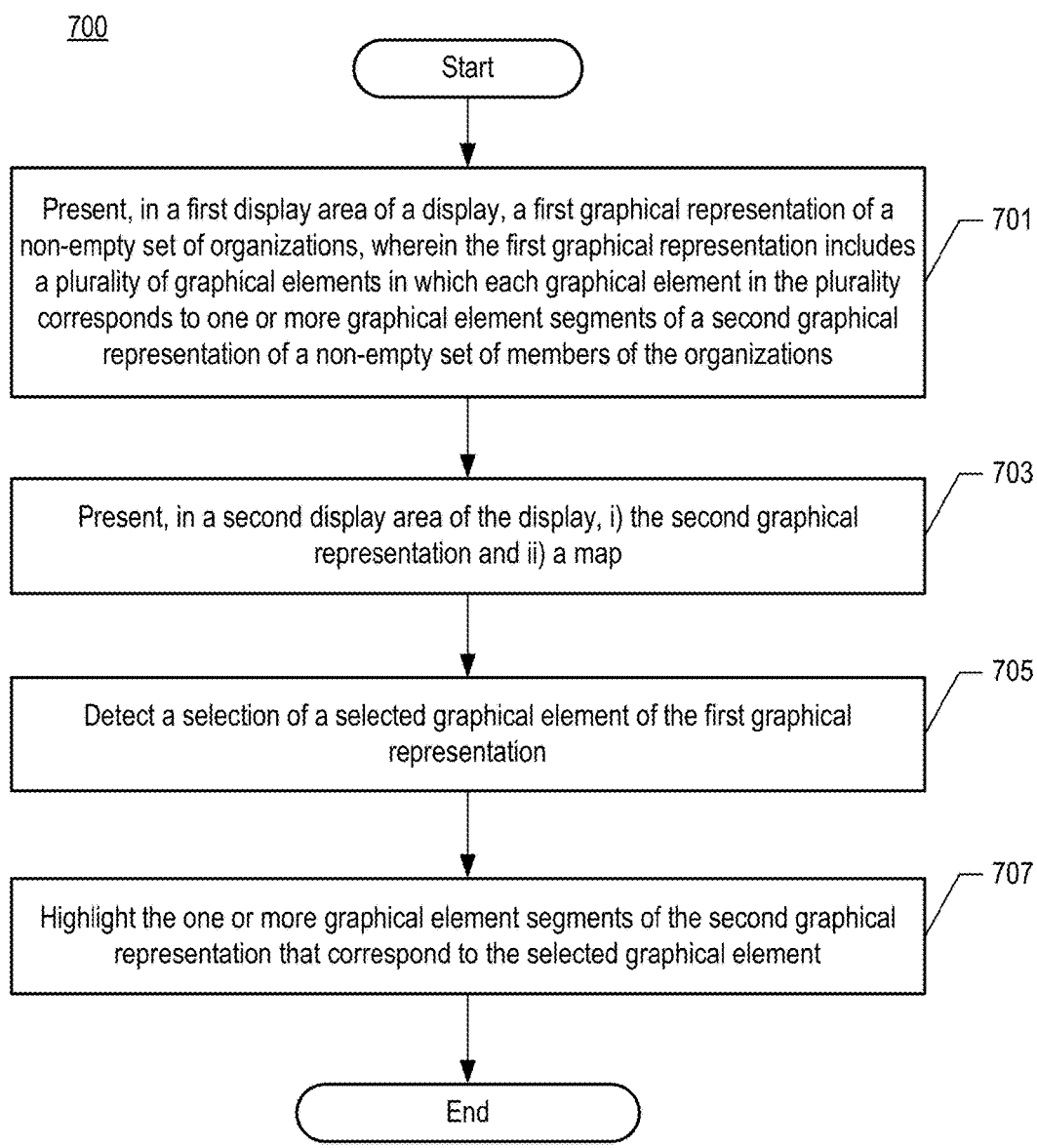
FIG. 7 depicts a flowchart of the salient processes of method 700, performed in accordance with the illustrative embodiment and corresponding to the presentation of one or more of the graphics objects depicted in FIGS. 6a and 6b.

FIG. 7 depicts a flowchart of the salient processes of method 700, performed in accordance with the illustrative embodiment. Method 700 corresponds to the presentation of one or more of the graphics objects depicted in FIGS. 6a and 6b. It will be clear to those having ordinary skill in the art, after reading the present disclosure, how to make and use alternative embodiments of method 700, as well as the other methods disclosed in this specification, wherein the recited operations sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

At task 701, data-processing system 201 processes display data such that display 210 presents, in display area 602, pie chart 606 of a non-empty set of service providers. Pie chart 606, a first graphical representation, includes a plurality of graphical elements, slices 610a-d, in which each graphical element in the plurality corresponds to one or more graphical element segments of a second graphical representation, such as bar chart segments, of a non-empty set of subscribers of the service providers. In some embodiments of the present invention, each graphical element in the plurality has a size that is determined based on i) the number of subscribers of a service provider that corresponds to the graphical element, in relation to ii) the total number of subscribers in the set of service providers. In some embodiments of the present invention, if a plurality of bars is positioned on map 608, their displayed positions are based on the geolocations of at least some of the subscribers represented in the second graphical representation.

At task 703, data-processing system 201 processes display data such that display 210 presents, in a display area 604, the second graphical representation. In some embodiments of the present invention, system 201 also presents map 608, which can be selected for display based on the geolocations of at least some of the subscribers. A plurality of graphical elements of the second graphical representation can be superimposed on map 608.

At task 705, data-processing system 201 detects a selection of a selected graphical element (i.e., slice) of pie chart 606.

At task 707, data-processing system 201 processes the selection such that display 210 highlights the one or more graphical element segments of the second graphical representation that correspond to the selected graphical element of the first graphical representation. In some embodiments of the present invention, the highlighting can occur during at least some of the time when the detecting is occurring. In some embodiments of the present invention, if the second graphical representation is a bar chart having a plurality of bars, each of the bars is positioned on the map such that its displayed position is based on the geolocations of at least some of the subscribers represented in the bar chart.

As those who are skilled in the art will appreciate after reading this specification, data-processing system 201 can detect additional selections and highlight the corresponding one or more graphical element segments, changing from highlighting one set of segments to the next depending on the selection.

Figure 8A:
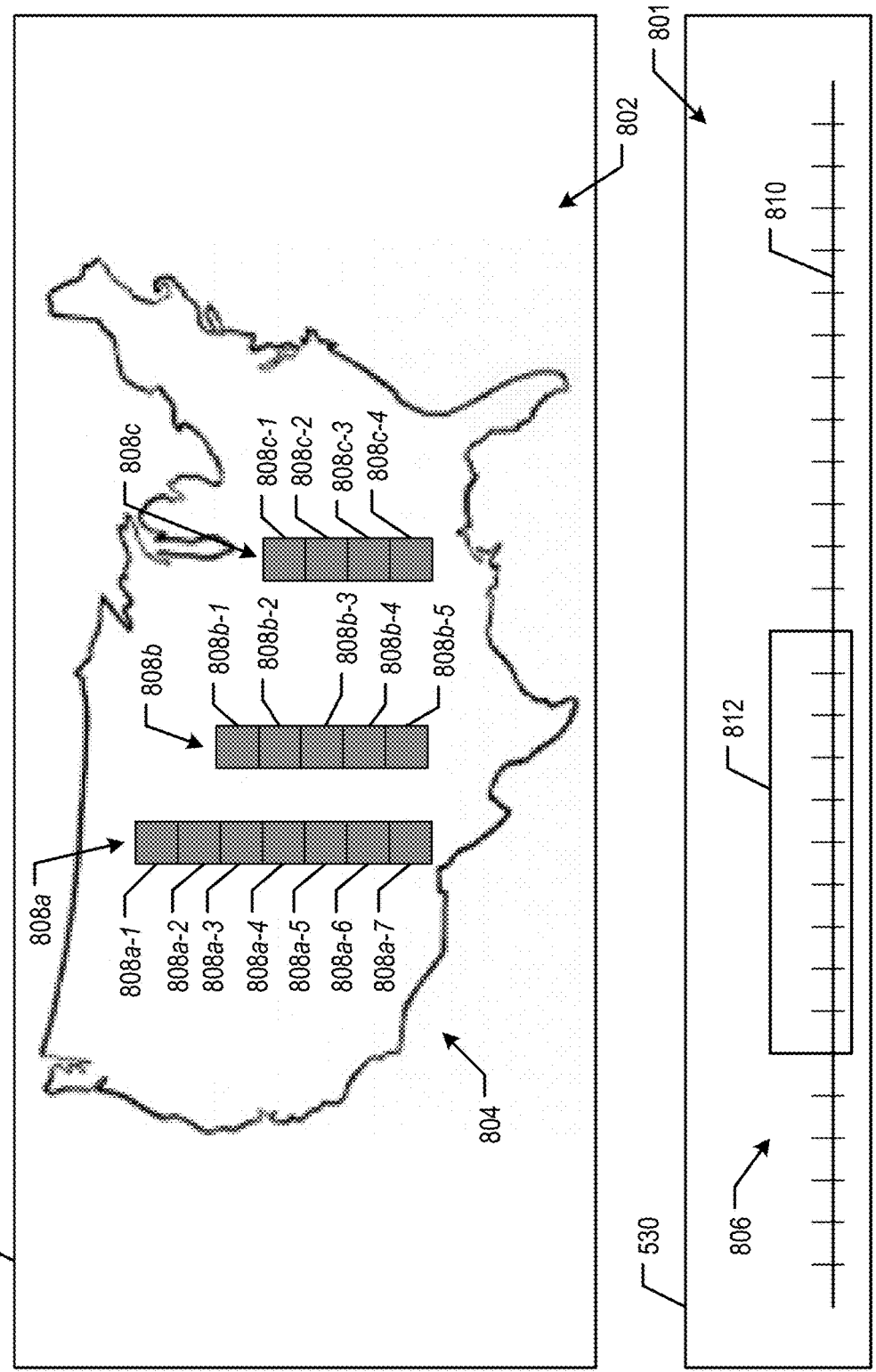
FIGS. 8a and 8b depict a second layout of graphics objects, as part of displayed image 550.

FIG. 8a depicts a second layout of graphics objects, as part of displayed image 550. Displayed image 550 provides i) timeline 806 in a first display area 801 and within timeline pane 530 and ii) map 804, a diagrammatic representation, in a second display area 802 and within display pane 510. Timeline 806, which can be dynamically created by processor 302, represents a graphical representation of the passage of time as a line. Timeline 806 comprises time axis 810 and time window 812. Time window 812 has i) a first end (e.g., leftmost end, etc.) for defining the earliest part of a time window of interest and ii) a second end (e.g., rightmost end, etc.) for defining the latest part of the time window of interest. A user of the display system can select the positions in time of the first and second ends. As those who are skilled in the art will appreciate after reading this specification, a different type of graphical representation than timeline 806 can be dynamically created and used.

Map 804, which can be dynamically created by processor 302, is a diagrammatic representation of a predetermined geographic region (e.g., at least a portion of geographic region 120, etc.). Map 804 in particular shows an outline of a geographic region (e.g., the continental United States, etc.). As those who are skilled in the art will appreciate after reading this specification, map 804 can show a different set of features than depicted, including physical features, types of roads, bodies of water, cities, buildings, labels that identify each of said features, and so on. As those who are skilled in the art will appreciate after reading this specification, a different type of diagrammatic representation than map 804 can be dynamically created and used.

Superimposed on map 804 and in the second display area 802 are elements of a bar chart, which is a graphical representation. Bars 808a-c, which can be dynamically created by processor 302, graphically represent a breakdown of subscribers by city (or local area or region) within map 804, wherein each bar corresponds to a different city. In some alternative embodiments of the present invention, each bar can correspond to a type of municipality, place, or feature different than a city. Display area 802 can also contain other information, such as text identifying each city and the numeric proportion in percent of each bar to the set of bars, which can be updated as the bar chart itself gets updated or the bars themselves get updated. As those who are skilled in the art will appreciate after reading this specification, a different type of graphical representation than the bar chart comprising bars 808a-c can be dynamically created and used.

Figure 8B:
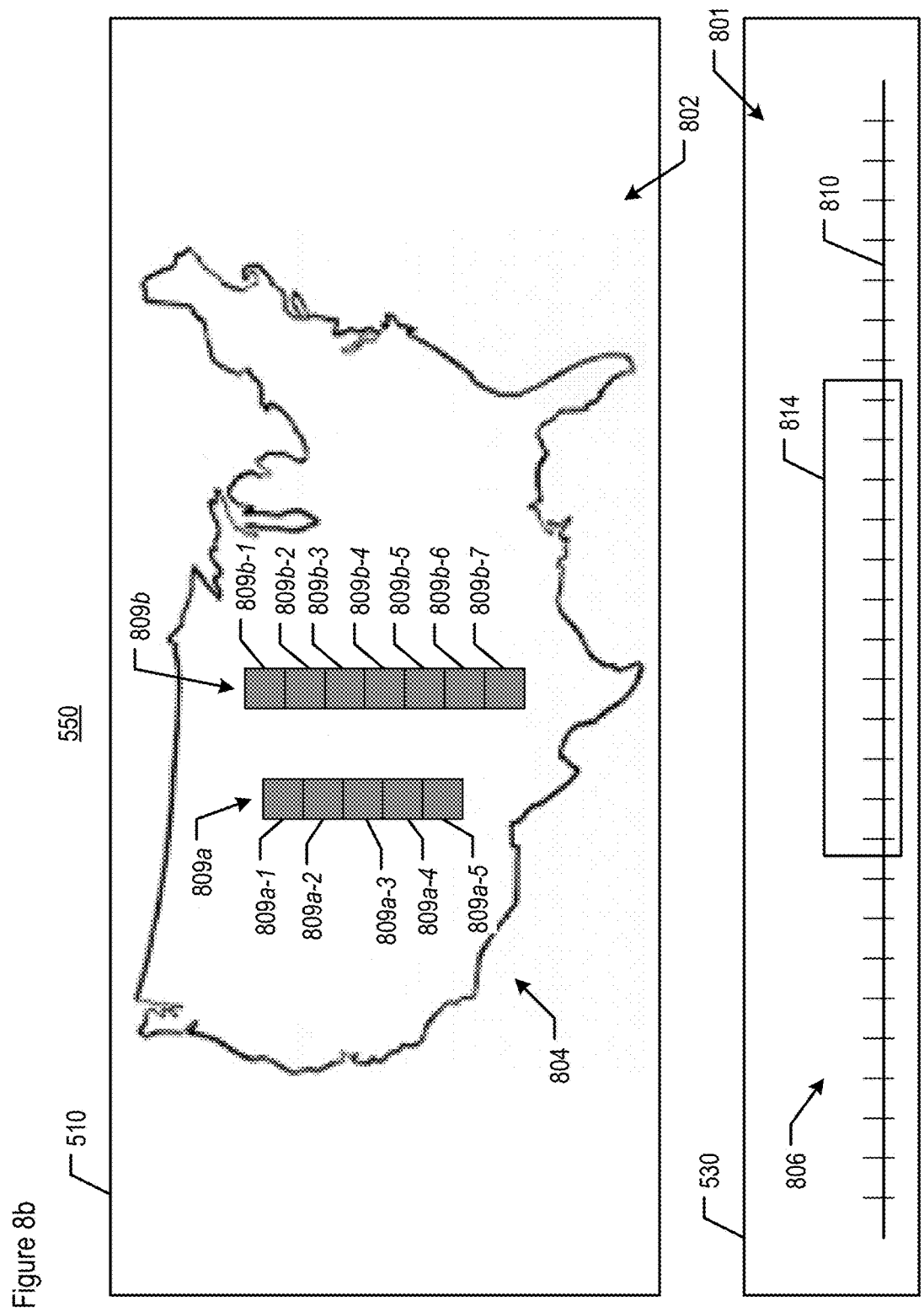

Each bar 808a-c contains one or more segments, such as segments 808a-1 through 808a-5, 808b-1 through 808b-7, and 808c-1 through 808c-4 in bars 808a, 808b, and 808c, respectively. In accordance with the illustrative embodiment, a particular set of one or more segments superimposed on map 804 corresponds to a selected time window of interest in timeline 806. Thus, for a first selected time window 812 in FIG. 8a, exactly bars 808a, 808b, and 808c might be displayed as a first set of graphical elements, each bar having the number of bar segments (or having the dimensions) that correspond to selected time window 812; in comparison, for a second selected time window 814 in FIG. 8b, exactly bars 809a and 809b might be displayed as a second set of graphical elements, each bar having the number of bar segments (or having the dimensions) that correspond to selected time window 814, for example and without limitation. As described later, the system of the illustrative embodiment can i) detect a selection of a particular time window of interest within timeline 806 and ii) highlight or display the specific one or more bars that correspond to the selected time window, each bar having dimensions that correspond to the selected time window.

In some alternative embodiments of the present invention, a different set of one or more segments superimposed on map 804 corresponds to a selected time window of interest in timeline 806. Thus, a first set of segments 808a-1, 808a-4, 808b-3, 808c-2, and 808c-3 might correspond to (i.e., be affiliated with) a first timeline with specific start and stop times, while a second set of segments 808a-6, 808a-7, 808c-1, and 808c-4 might correspond to a second timeline with a different start and/or stop time than those of the first timeline, for example and without limitation. Accordingly, in some embodiments of the present invention, the system can i) detect a selection a particular time window of interest within timeline 806 and ii) highlight the one or more graphical element segments of bars 808a-c that correspond to the selected window of interest within timeline 806.

Figure 9:
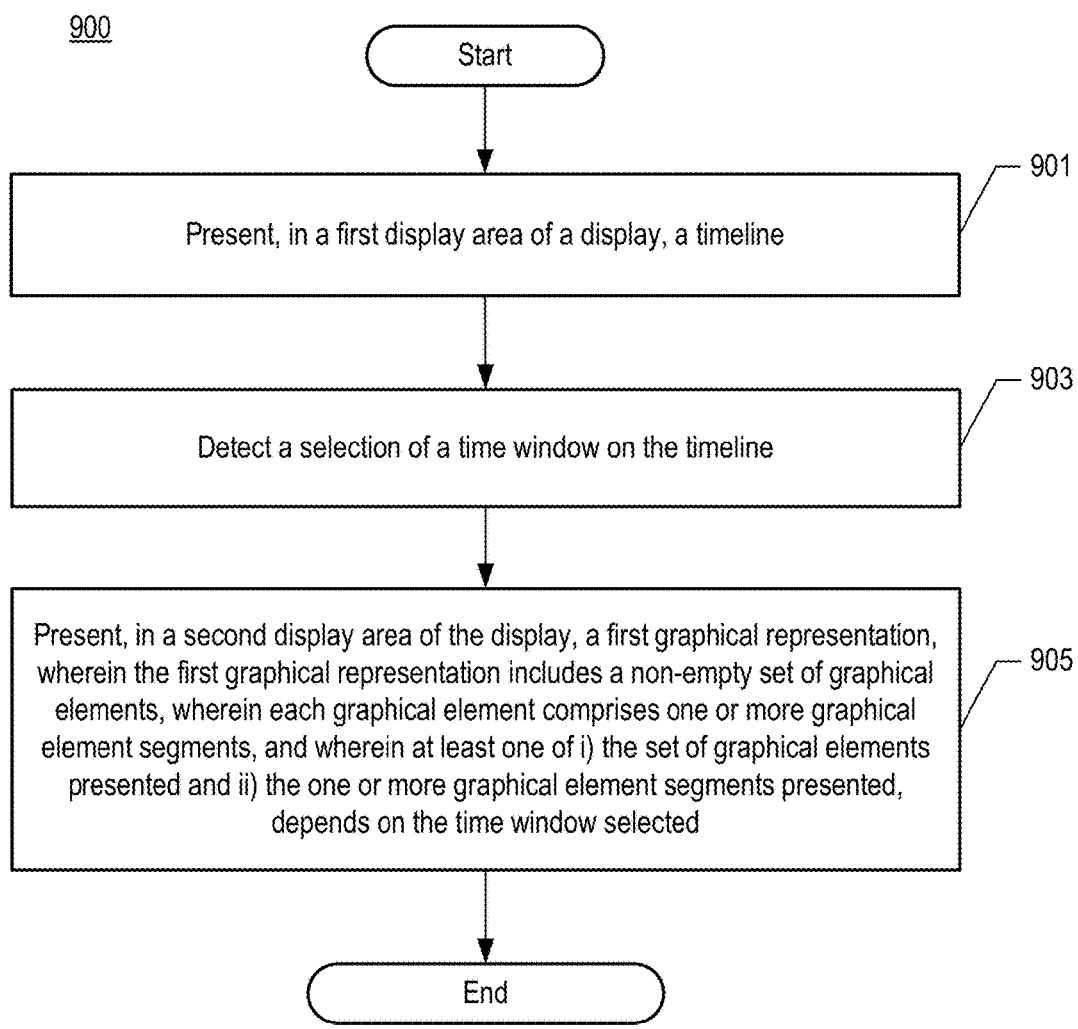
FIG. 9 depicts a flowchart of the salient processes of method 900, performed in accordance with the illustrative embodiment and corresponding to the presentation of one or more of the graphics objects depicted in FIGS. 8a and 8b.

FIG. 9 depicts a flowchart of the salient processes of method 900, performed in accordance with the illustrative embodiment. Method 900 corresponds to the presentation of one or more of the graphics objects depicted in FIGS. 8a and 8b.

At task 901, data-processing system 201 processes display data such that display 210 presents timeline 806 in display area 801.

At task 903, data-processing system 201 detects a selection of a time window on timeline 806.

At task 905, data-processing system 201 presents, in display area 802, a first graphical representation, wherein the first graphical representation includes a non-empty set of graphical elements, bars 808a-c. In some embodiments of the present invention, each graphical element comprises one or more graphical element segments (e.g., segment 808a-1, etc.). In some embodiments of the present invention, at least one of i) the set of graphical elements present and ii) the one or more graphical elements present, is affected by the time window selected. For example, the time window selected (e.g., start time, stop time, etc.) can affect the sizes of the graphical elements displayed (e.g., length, number of segments, etc.), the number of graphical elements displayed, the color of each graphical element displayed, and/or the particular combination of graphical elements displayed.

Figure 10:
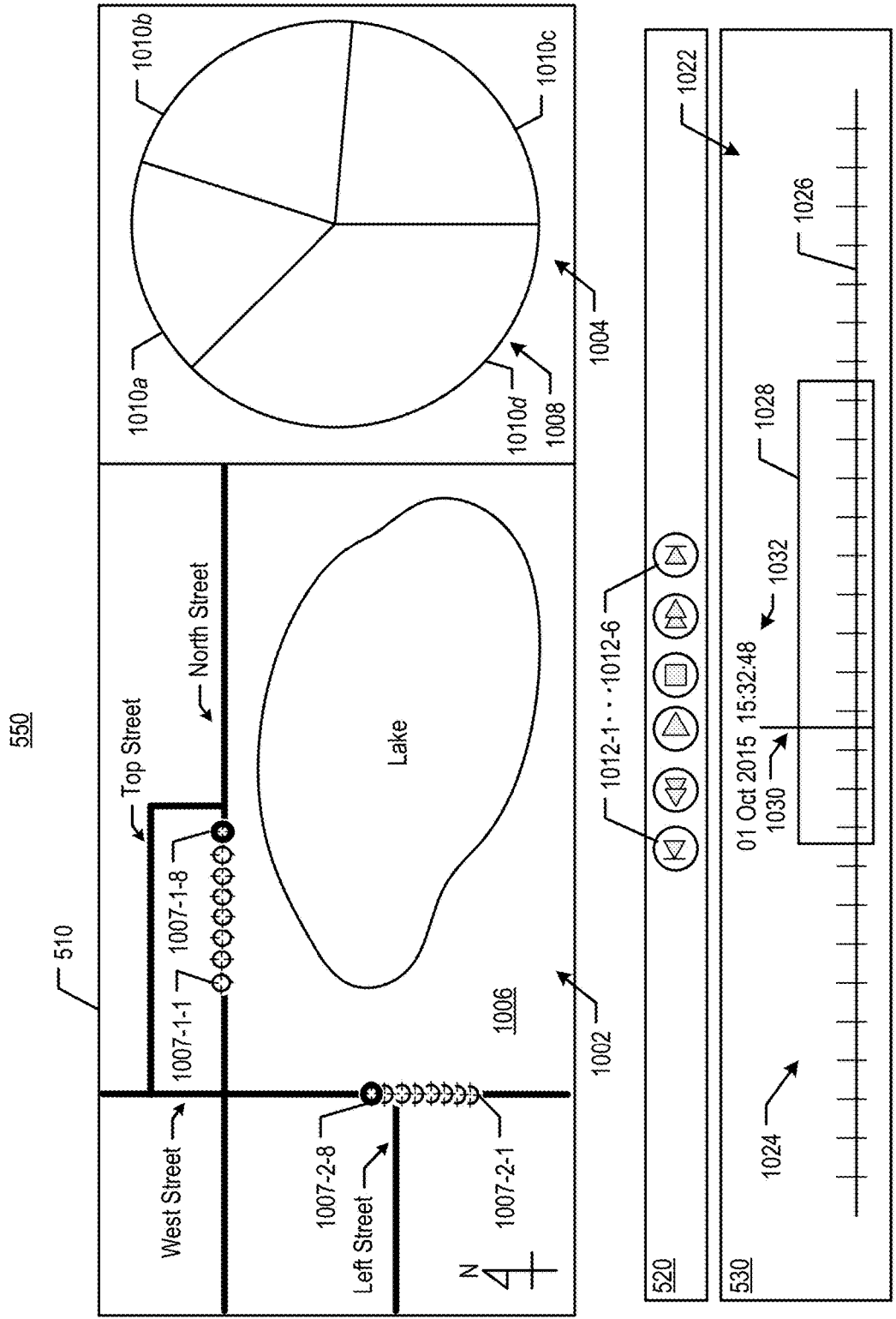
FIG. 10 depicts a third layout of graphics objects, as part of displayed image 550.

FIG. 10 depicts a third layout of graphics objects, as part of displayed image 550. Displayed image 550 provides, within display pane 510, i) map 1006, a diagrammatic representation, in a first display area 1002 and ii) pie chart 1008, a graphical representation, in a second display area 1004. Displayed image 550 also provides i) playback command controls in a third display area and within playback command pane 520, and ii) timeline 1024 in a fourth display area 1022 and within timeline pane 530.

Map 1006, which can be dynamically created by processor 302, is a diagrammatic representation of a predetermined geographic region (e.g., at least a portion of geographic region 120, etc.). Map 1006, which can be dynamically created by processor 302, is a representation of an area comprising land and/or water. Map 1006 in particular shows roads and a lake, with labels that identify each of said features. As those who are skilled in the art will appreciate after reading this specification, display pane 510 is capable of containing a map showing a different set of features than those depicted, including other physical features, other types of roads, other bodies of water, cities, buildings, and so on, as well as other types of labeling. As those who are skilled in the art will appreciate after reading this specification, a different type of diagrammatic representation than map 1006 can be dynamically created and used.

Pane 510 within display area 1002 also contains markers 1007-1-1 through 1007-1-N that correspond to a series of N positions in relation to map 1006, the N positions corresponding to a first series of N geolocations of where a first object, wireless terminal 101-1, is estimated by location engine 112 to have been. As depicted, N is equal to 8, although in some embodiments of the present invention N can have a different value than depicted (e.g., 50, etc.). Similarly, pane 510 contains markers 1007-2-1 through 1007-2-N that correspond to a second series of N positions in relation to map 1006, the N positions corresponding to a series of N geolocations of where a second object, wireless terminal 101-2, is estimated by location engine 112 to have been. Although as depicted the number of markers associated with wireless terminal 101-1 and the number of markers associated with wireless terminal 101-2 are equal to each other, in some alternative embodiments of the present invention the number of markers can vary across different wireless terminals and/or under different circumstances.

Each series of markers represent a predetermined activity of the particular wireless terminal being displayed, such as movement within the displayed geographic area. In each series of markers as depicted, in a session that is being played back, the highest-indexed marker (e.g., marker 1007-1-N, marker 1007-2-N) corresponds to the newest currently displayed position. Meanwhile, the lowest-indexed marker (e.g., marker 1007-1-1, marker 1007-2-1) corresponds to the oldest currently displayed position. Each equally-indexed marker across multiple wireless terminals (i.e., markers 1007-1-n and 1007-2-n) corresponds to the same moment in absolute time. For example, markers 1007-1-8 and 1007-2-8 represent the newest currently displayed positions for terminals 101-1 and 101-2, respectively, and for the same absolute time being displayed. With regard to marker spacing, the position markers for wireless terminal 101-1 are spaced farther part than the position markers for wireless terminal 101-2, thereby suggesting that terminal 101-1 is moving faster than terminal 101-2, at least when they were at the geolocations currently being played back and displayed.

Pie chart 1008, which can be dynamically created by processor 302 within display area 1004, graphically represents a breakdown of members by organization or, more specifically in the example, a breakdown of subscribers by wireless service provider (e.g., Sprint Corporation, T-Mobile, AT&T Mobility, Verizon Wireless, etc.), wherein each subscriber is represented by a wireless terminal being tracked. In this example, each "slice" (or "wedge") 1010a-d corresponds to a different service provider. Display area 1004 can also contain other information, such as text identifying each service provider and the numeric proportion in percent of each slice to the overall pie chart, which can be updated as the pie chart itself gets updated or the slices themselves get updated. As those who are skilled in the art will appreciate after reading this specification, a different type of graphical representation than pie chart 1008 can be dynamically created and used.

As described later, the system of the illustrative embodiment can present pie chart 1008, wherein each slice 1010a-d in the pie chart represents a different wireless service provider, and wherein the size of each slice can vary dynamically depending on i) the objects appearing, or not appearing, within display area 1002, or ii) the particular time window 1028 configured (e.g., position on time axis 1026, start time, stop time, etc.), or both.

Playback command pane 520 is depicted as containing playback command controls 1012-1 through 1012-P. As depicted, P is equal to 6, although in some embodiments of the present invention P can have a different value than depicted. Playback controls 1012-1 through 1012-6 correspond to control functions "skip back", "rewind", "play", "pause", "fast-forward", and "skip ahead", respectively. As those who are skilled in the art will appreciate after reading this specification, a different set of playback control functions can be present.

Timeline 1024, which can be dynamically created by processor 302, represents a graphical representation of the passage of time as a line. Timeline 1024 comprises time axis 1026 and time window 1028. Time window 1028 has i) a first end (e.g., leftmost end, etc.) for defining the earliest part of a time window of interest and ii) a second end (e.g., rightmost end, etc.) for defining the latest part of the time window of interest. A user of the display system can select the positions in time of the first and second ends. Time window 1028 corresponds to the duration of time of interest, during which one or more wireless terminals might or might not be present in the area defined by map 1006. As those who are skilled in the art will appreciate after reading this specification, a different type of graphical representation than timeline 1024 can be dynamically created and used.

Also provided in displayed image 550 are playhead 1030 and alphanumeric time 1032, both of which are indications that correspond to the time at which terminals 101-1 and 101-2 were at the positions represented by their leading position markers. As those who are skilled in the art will appreciate after reading this specification, in some embodiments a different combination of elements can be present within timeline pane 530 such as an alphanumeric time without the date, a different formatting of the time and/or date, a different style of playhead, and so on, for example and without limitation.

Figure 11:
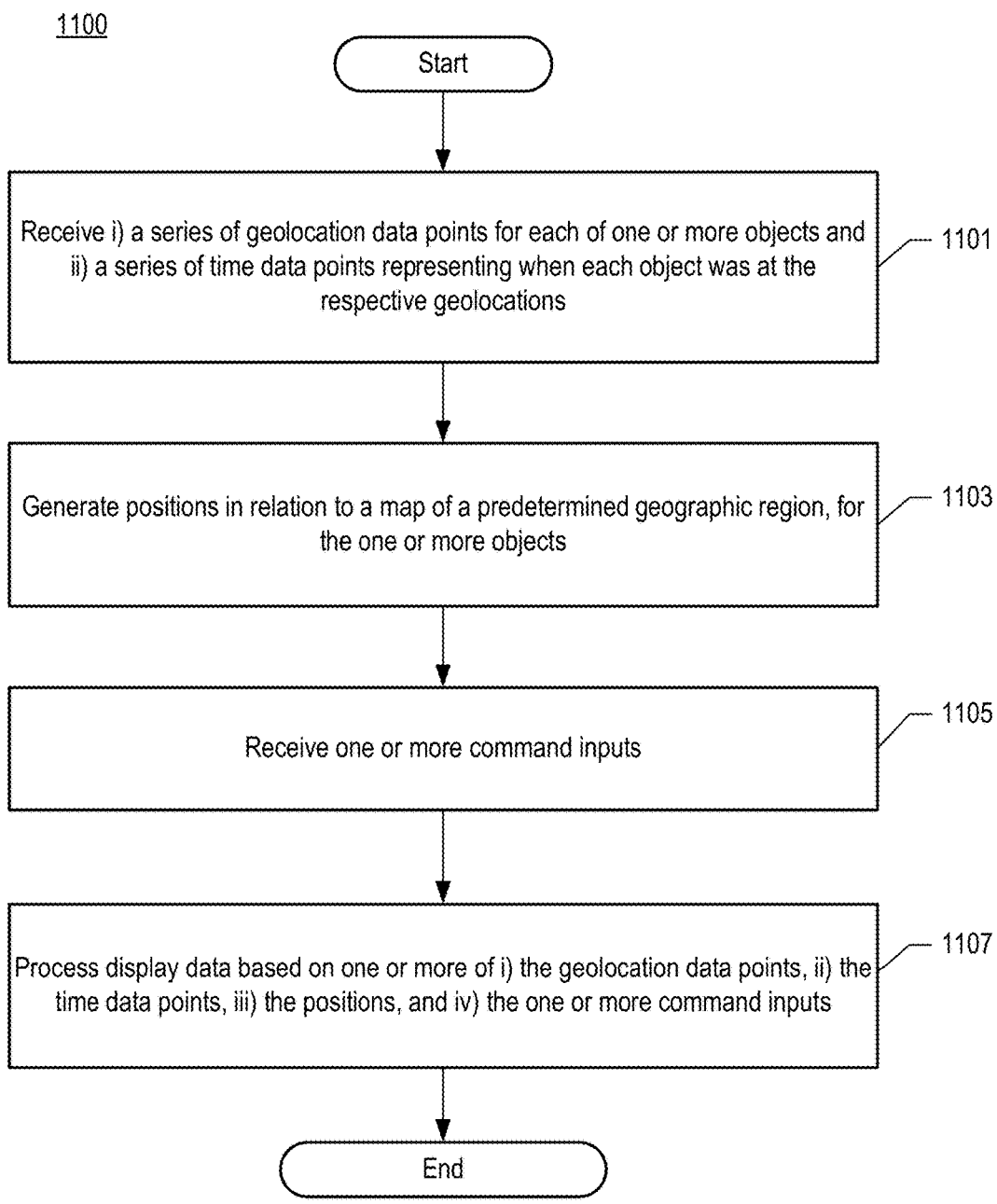
FIG. 11 depicts a flowchart of the salient processes of method 1100, performed in accordance with the illustrative embodiment and corresponding to the presentation of one or more of the graphics objects depicted in FIG. 10.

FIG. 11 depicts a flowchart of the salient processes of method 1100, performed in accordance with the illustrative embodiment. Method 1100 corresponds to the presentation of one or more of the graphics objects depicted in FIG. 10.

At task 1101, data-processing system 201 receives data points that are representative of a series of geolocations for each of one or more objects. In some embodiments the first and second object, such as i) wireless terminals or ii) subscribers affiliated with said terminals (or vice-versa), are affiliated with an organization, such as a service provider. System 201 also receives data points that are representative of a series of times representing when each object was at the respective geolocations. Task 1101 is described in detail below and with respect to FIG. 12.

At task 1103, data-processing system 201 generates positions in relation to a map of a predetermined geographic region, for the one or more objects. Task 1103 is described in detail below and with respect to FIG. 13.

At task 1105, data-processing system 201 receives one or more command inputs (e.g., via keyboard 212, via pointing device 213, etc.). Task 1105 is described in detail below and with respect to FIG. 14.

At task 1107, data-processing system 201 processes display data based on one or more of i) the geolocation data received in accordance with task 1101, ii) the time data received in accordance with task 1101, iii) the positions generated in accordance with task 1103, and iv) the one or more command inputs received in accordance task 1105. Task 1107 is described in detail below and with respect to FIG. 15.

Figure 12:
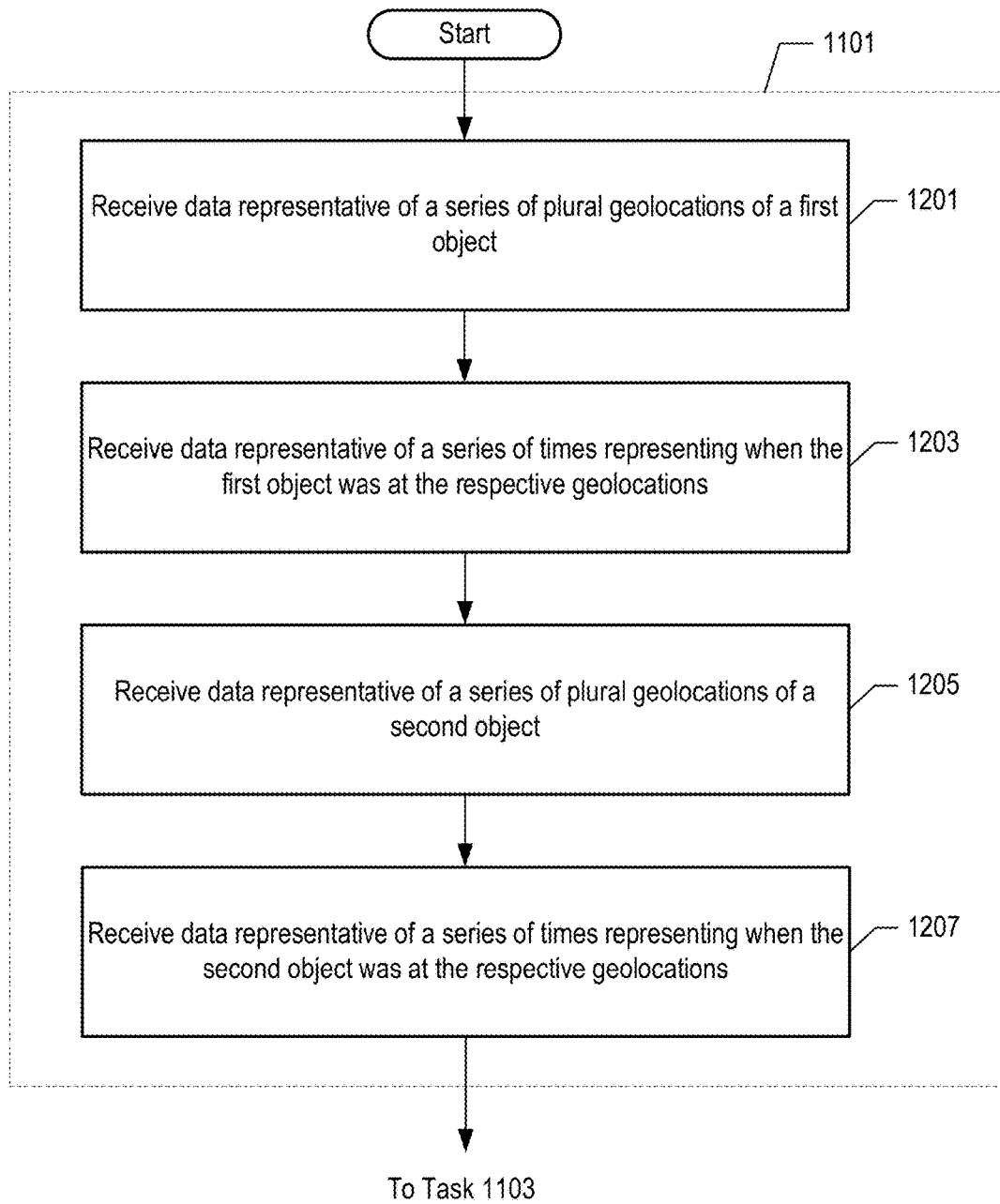
FIG. 12 depicts a flowchart of the salient processes of task 1101.

FIG. 12 depicts a flowchart of the salient processes of task 1101. At task 1201, data-processing system 201 receives, from location engine 112, data that are representative of a series of plural geolocations of wireless terminal 101-1 (i.e., a first object).

At task 1203, data-processing system 201 receives, from location engine 112, data that are representative of a series of times representing when wireless terminal 101-1 was at the respective geolocations received in accordance with task 1201.

At task 1205, data-processing system 201 receives, from location engine 112, data that are representative of a series of plural geolocations of wireless terminal 101-2 (i.e., a second object).

At task 1207, data-processing system 201 receives, from location engine 112, data that are representative of a series of times representing when wireless terminal 101-2 was at the respective geolocations received in accordance with task 1205.

Control of task execution then proceeds to task 1103.

Figure 13:
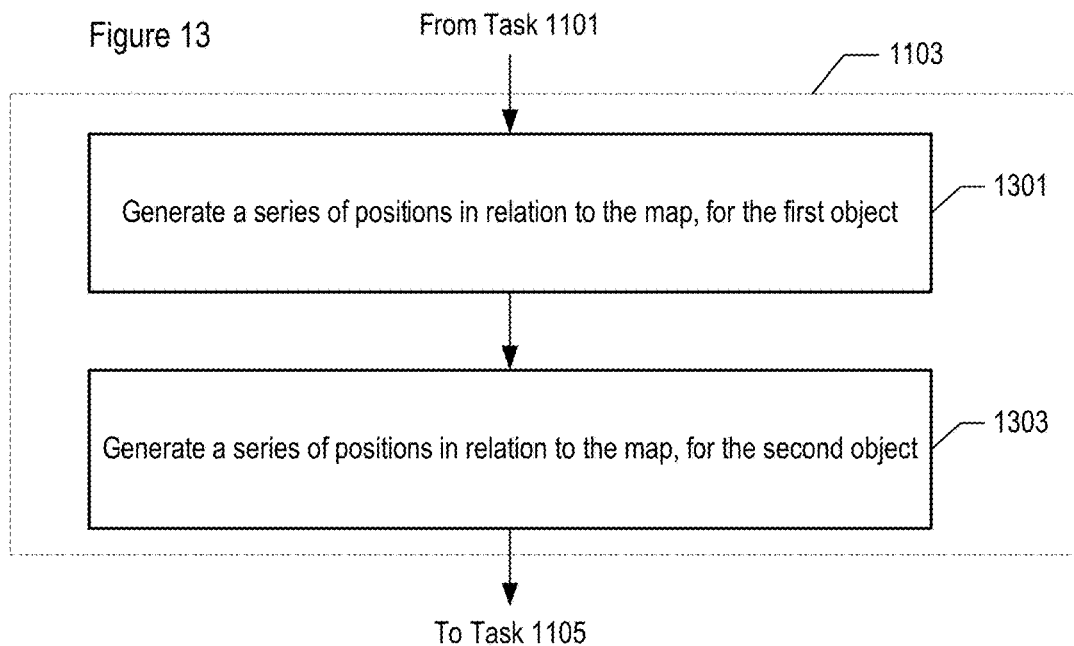
FIG. 13 depicts a flowchart of the salient processes of task 1103.

FIG. 13 depicts a flowchart of the salient processes of task 1103. At task 1301, data-processing system 201 generates a first series of positions in relation to map 1006 of a predetermined geographic region, including positions 1007-1-1 through 1007-1-8. The positions in the first series of positions are based on the respective geolocations in the series of geolocations of wireless terminal 101-1 received at task 1201.

At task 1303, data-processing system 201 generates a second series of positions in relation to map 1006, including positions 1007-2-1 through 1007-2-8. The positions in the second series of positions are based on the respective geolocations in the series of geolocations of wireless terminal 101-2 received at task 1205.

As those who are skilled in the art will appreciate after reading this specification, the generating of the series of positions whose markers are to be displayed can be performed in a variety of ways. For example, the generating can occur based on a playback command having been selected, or the generating can occur independent of a playback command but dependent on the amount of geolocation data received, or can be independent of both. Also, the number of map positions being generated can be based on the number of markers to be displayed at any given time or can be independent of the number of markers.

Control of task execution then proceeds to task 1105.

Figure 14:
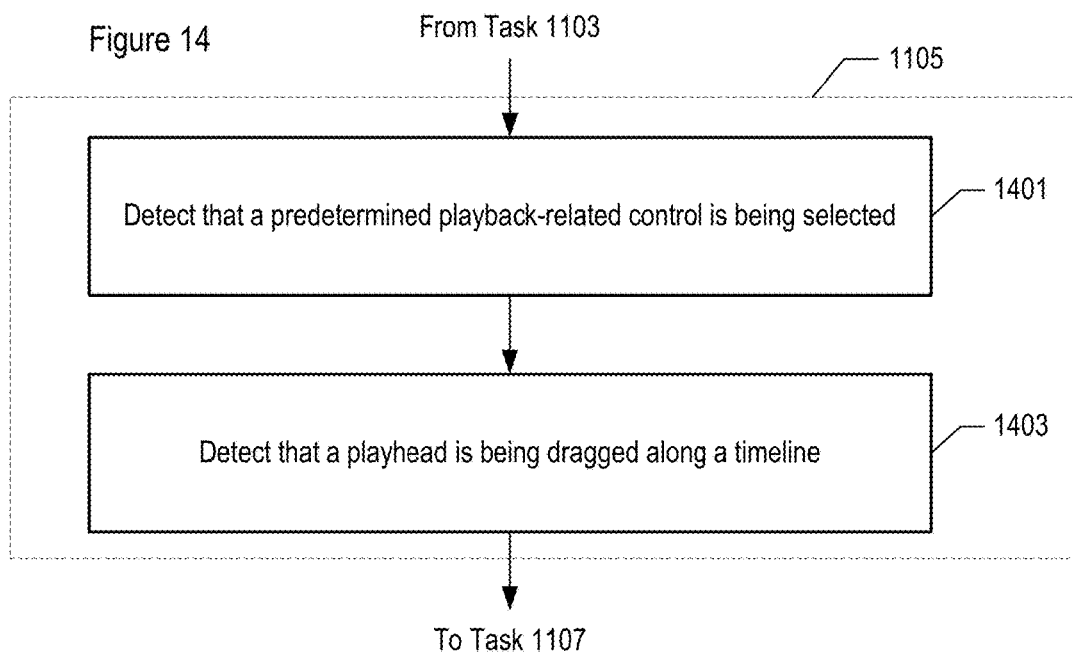
FIG. 14 depicts a flowchart of the salient processes of task 1105.

FIG. 14 depicts a flowchart of the salient processes of task 1105. At task 1401, data-processing system 201 detects that a predetermined, playback-related control of controls 1012-1 through 1012-6 is being selected. System 201 then stores an indication of the particular selection in memory 303, the indication being used later in order to determine how to control playback.

At task 1403, data-processing system 201 detects that playhead 1030 is being dragged along time window 1028. System 201 then stores an indication of where the playhead is being dragged to and on which timeline or timelines, the indication being used later in order to determine how to update the display based on the playhead position.

Control of task execution then proceeds to task 1107.

Figure 15:
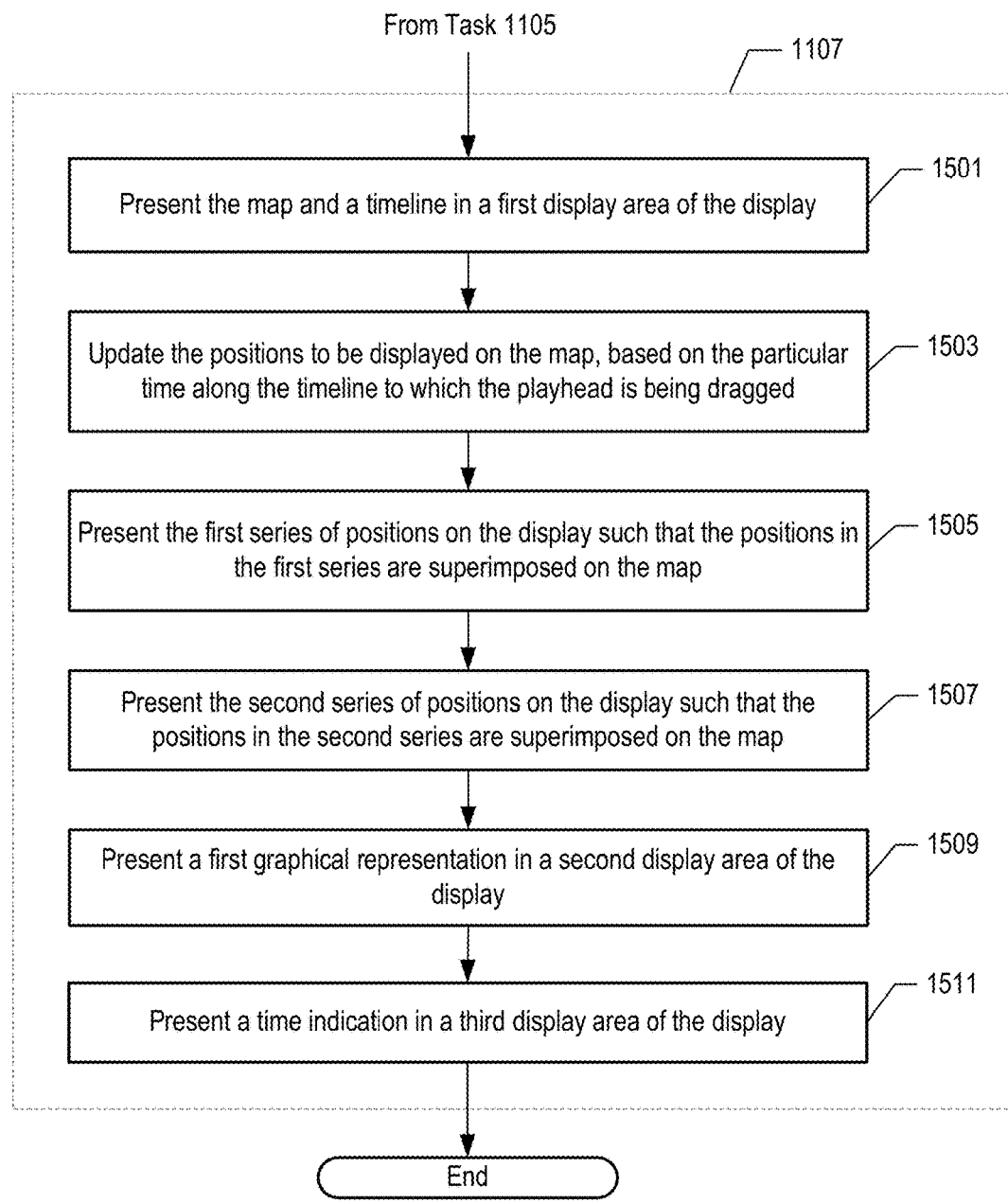
FIG. 15 depicts a flowchart of the salient processes of task 1107.

FIG. 15 depicts a flowchart of the salient processes of task 1107. In performing these display-related tasks, data-processing system 201 generates displayable information and transmits it to display 210, which then receives the transmitted information and performs the actual presenting of the displayable information to a user of display system 113.

At task 1501, data-processing system 201 processes display data such that display 210 displays map 1006 in display area 1002. System 201 also processes display data such that display 210 displays time window 1028 in display area 1022.

Figure 16:
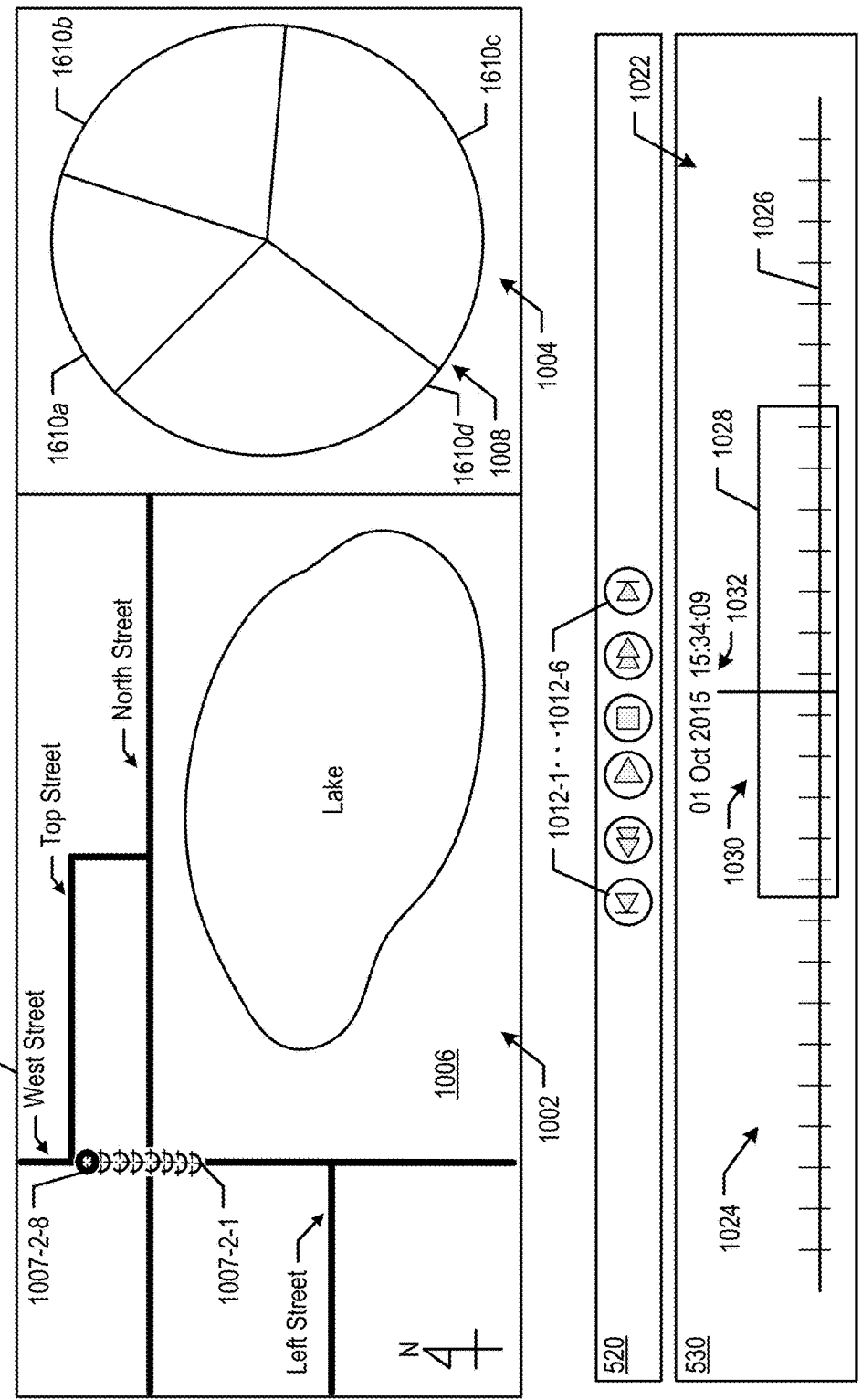
FIG. 16 depicts an example of playhead 1030 having been dragged to a new position with respect to time window 1028, as reflected in displayed image 1650.

At task 1503, data-processing system 201 updates the positions being displayed on map 1006, based on the particular time along the first timeline to which the playhead is being dragged, as detected and stored at task 1403. FIG. 16 depicts an example of playhead 1030 having been dragged to a new position with respect to time window 1028, as reflected in displayed image 1650. In particular, playhead 1030 has been dragged to a new position within timeline pane 530, the new position being further to the right and further along the timeline from where it was before. Alphanumeric time 1032 has been updated accordingly to indicate a later time.

Correspondingly, the position markers for wireless terminal 101-1 and position markers for wireless terminal 101-2 are also updated in FIG. 16 and show how wireless terminals 101-1 and 101-2 have progressed in their movements. They are generated, if they are not already available from tasks 1301 and 1303, and then based on the later geolocation data corresponding to the later time to which the playhead has been dragged, the positions are displayed respectively in FIG. 16 as i) no longer appearing on the map and ii) markers 1007-2-1 through 1007-2-8. The position of wireless terminal 101-1 as of the currently displayed time, "15:34:09", is actually out of (i.e. non-coincident with) the geographic region represented by map 1006.

At task 1505 in FIG. 15, data-processing system 201 updates for display on display 210 position markers of the series of positions for wireless terminal 101-1. As of time 15:34:09, no position markers are displayed because the terminal is off the map, as reflected in FIG. 16, in contrast with time 15:32:48 at which time position markers 807-1-1 through 807-1-8 are displayed as seen in FIG. 10.

At task 1507, data-processing system 201 updates for display on display 210 position markers of the series of positions for wireless terminal 101-2, such that the positions in the series are superimposed on map 1006. As of time 15:34:09, position markers 1601-2-1 through 1601-2-7 are displayed, as seen in FIG. 16, in contrast with time 15:32:48 at which time position markers 1007-2-1 through 1007-2-8 are displayed as seen in FIG. 10. Any appearance on the map, or not, of the positions in the series for terminal 101-1 and any appearance on the map, or not, of the positions in the series for terminal 101-2 are independent of each other, and are determined by the geolocation data and time data for each wireless terminal.

At task 1509, data-processing system 201 processes display data such that display 210 presents, in display area 1004, pie chart 1008 of the non-empty set of organizations (e.g., service providers, etc.) with which the objects (e.g., wireless terminals, subscribers, etc.) that are displayable in display area 1002 are affiliated. Pie chart 1008, a first graphical representation, includes a plurality of graphical elements, slices 1010a-d, in which each graphical element in the plurality corresponds to a different organization of the objects being displayed in display area 1002.

In some embodiments of the present invention, each graphical element in the plurality has a size that is determined based on the metrics of i) the number of objects that are affiliated with the organization that corresponds to the graphical element, in relation to ii) the total number of objects that are affiliated with the set of organizations. The "number of objects" can be taken to mean the number of objects that appear on map 1006 at a particular moment (e.g., currently, at 6:00 am, exactly two hours ago, etc.), the number of objects both appearing and not appearing, the number of objects having appeared on map 1006 at least once during a predetermined time interval, and so on. The "total number of objects" can be taken to mean the total number of objects that appear on map 1006 for all organizations at a particular moment (e.g., currently, at 6:00 am, exactly two hours ago, etc.), the total number of objects both appearing and not appearing for all organizations, the total number of objects having appeared on map 1006 at least once for all organizations during a predetermined time interval, and so on. In at least some embodiments of the present invention, whether or not an object appears on map 1006 can be synonymous with whether or not the object is in the geographic area that corresponds to the map.

In some embodiments of the present invention, the sizes of slices 1610a-d in FIG. 16 are continually updated, based, at least in part, on one or more objects appearing, or not appearing, on map 1006. For example and without limitation, the size of slice 1610c is bigger in FIG. 16 than that of slice 1010c in FIG. 10, and the size of slice 1610d is smaller in FIG. 16 than that of slice 1010c in FIG. 10; this can be attributed to object 1007-1 having disappeared off of map 1006 in FIG. 16. In some embodiments of the present invention, the number of pie slices (i.e., graphical elements) might change over time and for similar reasons, as the number of organizations changes as represented in the metrics.

At task 1511, data-processing system 201 processes display data such that display 210 presents, in display area 1022 or elsewhere, one or more indications of the time, determined from data that are representative of the series of times received at task 1203 or task 1207, or both, at which the first object was at a particular geolocation that corresponds to a particular position, in one or more series of positions that are being displayed on map 1006. Non-limiting examples of the displayed indication of time include playhead 1030 and alphanumeric time 1032. In some embodiments, the position of the indication of time being displayed is coincident to a position on a timeline that corresponds to a particular position marker (e.g., the leading marker) that is being displayed on map 1006.

In regard to tasks 1505 through 1511, if a predetermined playback-related control has been selected, as detected and stored at task 1401, data-processing system 201 takes further action in regard to displaying the position markers of the wireless terminal or terminals and the indication of the time currently being displayed. If a "play" control has been selected, system 201 plays the activities of one or more objects, for example showing movement of each object on the display as time progresses. In doing so, system 201 displays the information such that the positions in each series that is being displayed are each initially displayed sequentially in time with respect to one another. Also, the indication of time that is being displayed is continually updated, as subsequent positions are displayed on map 1006.

In other words, data-processing system 201 streams the displayable data onto map 1006 displayed by display 210, as the most-recent N position markers. During session playback, these markers appear to move around the map for each object, corresponding to how the geolocation data represents the object moving during a period of time and around the geographic region represented by the map. Concurrently, data-processing system 201 processes the displayable data such that pie chart 1008 is continually updated and displayed by display 210 to reflect the displayed objects 1007 on the map.

Figure 17A:
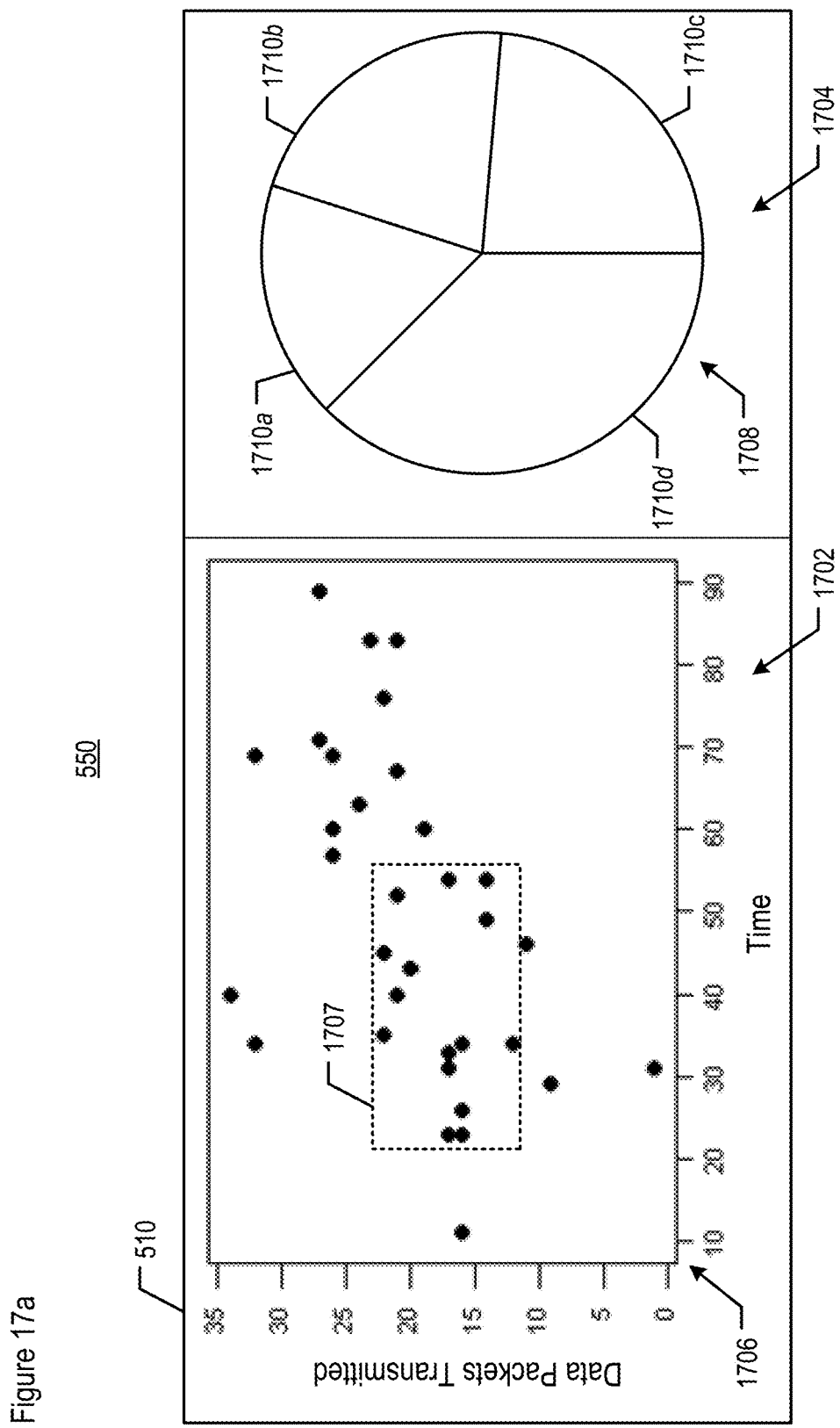
FIGS. 17a and 17b depict a fourth layout of graphics objects, as part of displayed image 550.

FIG. 17a depicts a fourth layout of graphics objects, as part of displayed image 550. Displayed image 550 provides, within display pane 510, i) scatter plot 1706, a collection of data points, in a first display area 1702 and ii) pie chart 1708, a graphical representation, in a second display area 1704.

Scatter plot 1706, which can be dynamically created by processor 302, depicts values for the variables of "time" and "data packets transmitted." As those who are skilled in the art will appreciate after reading this specification, however, scatter plot 1706—or a different type of collection of data points, for that matter—can be used to depict values for other combinations of variables. In the depicted example, each data point corresponds to a particular data communication transacted by a particular wireless terminal of a particular terminal user and at a particular time; for that data point, scatter plot 1706 shows the number of data packets transmitted for that data communication. Some of the wireless terminals and their users might be affiliated with a first wireless service provider (e.g., Sprint Corporation, etc.), while some might be affiliated with a second wireless service provider (e.g., T-Mobile, etc.), and so on.

Superimposed on scatter plot 1706 is selection window 1707. Selection window 1707 can be used to specify or select a subset of the data points on the scatter plots, by the user varying i) the relative dimensions of the window and ii) its position within the field of data points.

Pie chart 1708, which can be dynamically created by processor 302 within display area 1704, graphically represents a breakdown of members by organization or, more specifically in the example, a breakdown of subscribers by wireless service provider (e.g., Sprint Corporation, T-Mobile, AT&T Mobility, Verizon Wireless, etc.). In this example, each "slice" (or "wedge") 1710*a-d* corresponds to a different service provider. Display area 1704 can also contain other information, such as text identifying each service provider and the numeric proportion in percent of each slice to the overall pie chart, which can be updated as the pie chart itself gets updated or the slices themselves get updated. As those who are skilled in the art will appreciate after reading this specification, a different type of graphical representation than pie chart 1708 can be dynamically created and used.

Figure 17B:
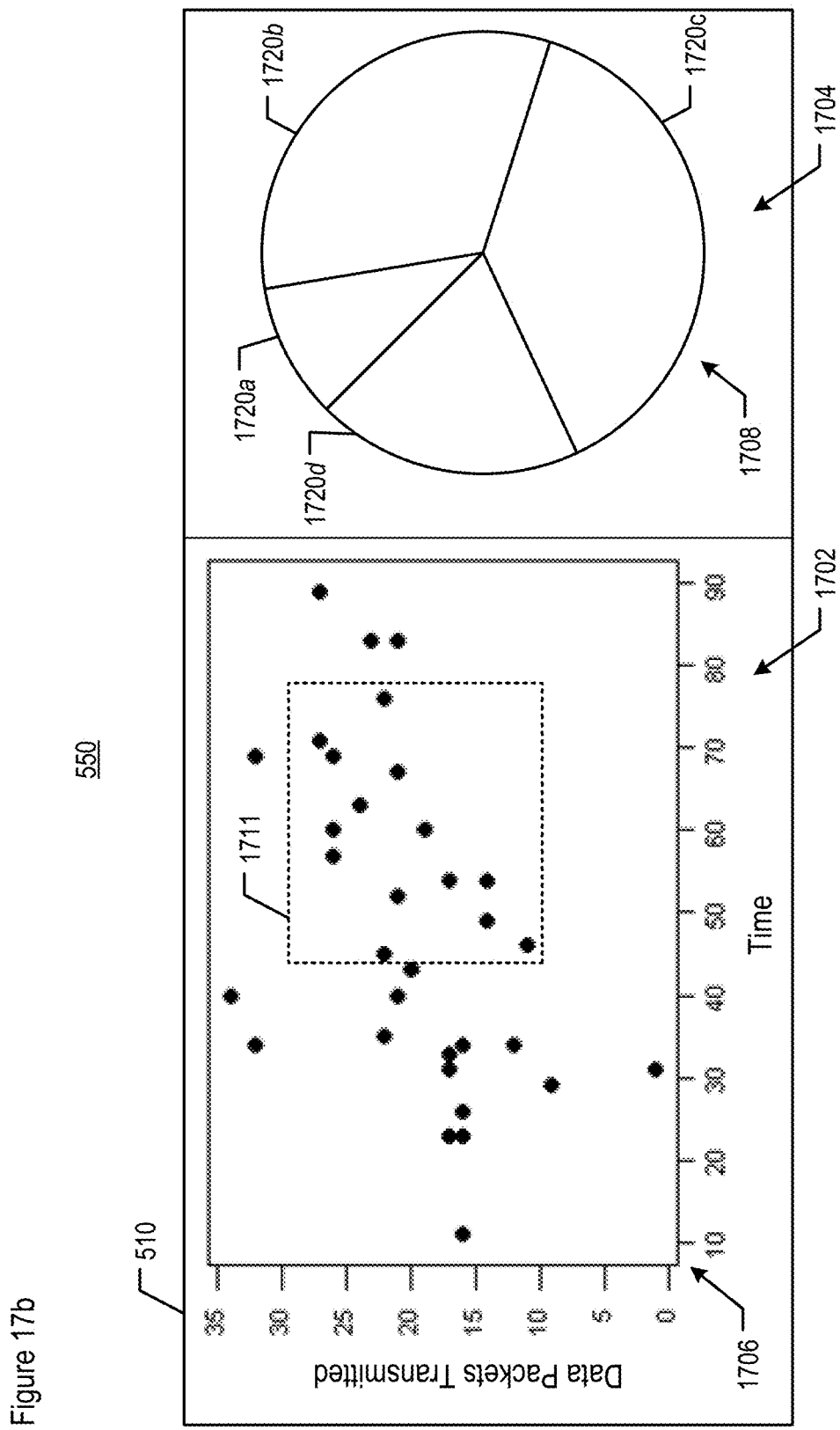

As described later, the system of the illustrative embodiment can present pie chart 1708, wherein each slice 1710*a-d* in the pie chart represents a different wireless service provider, and wherein the size of each slice can vary dynamically depending on the data points appearing, or not appearing, within selection window 1707. For example, the sizes of slices 1710*a-d* in FIG. 17*a* are based on first selection window 1707, while the sizes of slices 1720*a-d* in FIG. 17*b* are based on second selection window 1711.

FIG. 18 depicts a flowchart of the salient processes of method 1800, performed in accordance with the illustrative embodiment. Method 1800 corresponds to the presentation of one or more of the graphics objects depicted in FIGS. 17*a* and 17*b*.

At task 1801, data-processing system 201 processes display data such that display 210 presents, in display area 1702, scatter plot 1706 corresponding to data generated by one or more computing devices (e.g., wireless terminals, etc.) of members of a non-empty set of organizations. In some embodiments of the present invention, each data point in the collection is representative of at least two variables.

At task 1803, data-processing system 201 detects a selection of at least a portion of the points in scatter plot 1706. The selection is illustrated by window 1707.

At task 1805, data-processing system 201 processes display data such that display 210 presents, in display area 1704, pie chart 1708 of the organizations. Pie chart 1708 includes a plurality of graphical elements, slices 1710*a-d*, in which each graphical element in the plurality corresponds to one or more points in scatter plot 1706. In some embodiments of the present invention, each graphical element in the plurality can have a size that is determined based on the portion of the data points selected.

In some embodiments of the present invention, each graphical element in the plurality has a size that is determined based on the metrics of i) the number of members, as represented in collection of data points, that are affiliated with the organization that corresponds to the graphical element, in relation to ii) the total number of members, as represented in collection of data points, that are affiliated with the set of organizations. The "number of members" can be taken to mean the number of members of an organization that are represented as data points within selection window 1707 at a particular moment (e.g., currently, at 6:00 am, exactly two hours ago, etc.), the number of members of an organization that are represented as data points throughout scatter plot 1706, the number of members of an organization that have been represented as data points within selection window 1707 at least once during a predetermined time interval, and so on. The "total number of members" can be taken to mean the total number of members that are represented as data points within selection window 1707 for all organizations at a particular moment (e.g., currently, at 6:00 am, exactly two hours ago, etc.), the total number of members that are represented as data points throughout scatter plot 1706 for all organizations, the total number of members having been represented as data points within selection window 1707 for all organizations at least once during a predetermined time interval, and so on. In some embodiments of the present invention, the number of pie slices (i.e., graphical elements) might change depending on the number of organizations represented in the metrics.

At task 1807, data-processing system 201 processes display data such that display 210 presents, in a third display area, a second graphical representation of a non-empty set of members of the organizations. The second graphical representation can be a bar chart having graphical elements, such as bars 612*a-c* in FIG. 6*a*, with graphical element segments, such as segments 612*a*-1 through 612*a*-7, 612*b*-1 through 612*b*-5, and 612*b*-1 through 612*b*-4, for example and without limitation. In some embodiments of the present invention, each graphical element (slice) in the plurality of graphical segments of pie chart 1708 corresponds to one or more graphical element segments of the second graphical representation. In some embodiments of the present invention, system 201 can also present a map, such as map 608, which can be selected for display based on the geolocations of at least some of the members of the organizations. A plurality of graphical elements of the second graphical representation can be superimposed on the map.

At task 1809, data-processing system 201 detects a selection of a selected graphical element (e.g., slice) of the second graphical representation (e.g., pie chart).

At task 1811, data-processing system 201 processes the selection such that display 210 highlights the one or more graphical element segments of the second graphical representation that correspond to the selected graphical element of the first graphical representation. In some embodiments of the present invention, the highlighting can occur during at least some of the time when the detecting is occurring. In some embodiments of the present invention, if the second graphical representation is a bar chart that has a plurality of bars and is being superimposed on a map, each of the bars is positioned on the map such that its displayed position is based on the geolocations of at least some of the subscribers represented in the bar chart.

In some embodiments of the present invention, tasks 1805 through 1811 can be considered analogous to tasks 701 through 707, respectively.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system for graphically representing data, the system comprising:
   a data-processing system configured to detect a selection of a first portion of data points in a scatter plot that is being displayed, the selection being indicated by a selection window superimposed on the scatter plot, wherein the scatter plot is representative of a collection of data points corresponding to data generated by one or more computing devices of members of a non-empty set of organizations, and wherein each data point in the collection is representative of at least two variables; and a display configured to:
a) present the scatter plot and selection window in a first display area of the display, and
b) present, in a second display area of the display, a first graphical representation of the organizations, wherein the first graphical representation includes a plurality of graphical elements in which each graphical element in the plurality corresponds to one or more data points in the collection of data points, and wherein each graphical element in the plurality has a size that is determined based on the first portion of data points selected and appearing within the selection window;

wherein the display is further configured to update the size of each graphical element in the plurality being displayed in the second display area, when a selection of a second portion of data points, different from the first portion of data points, in the scatter plot is detected.

2. The system of claim 1 wherein the size is determined further based on i) the number of members of an organization that corresponds to the graphical element, in relation to ii) the total number of members in the set of organizations.

3. The system of claim 1 wherein the first graphical representation is a pie chart having a plurality of slices as graphical elements.

4. The system of claim 1 wherein the first graphical representation is a bar chart having a plurality of bars as graphical elements.

5. The system of claim 1 wherein the display is further configured to present, in a third display area of the display, a second graphical representation of a non-empty set of members of the organizations, wherein the first graphical representation includes a plurality of graphical elements in which each graphical element in the plurality corresponds to one or more graphical element segments of the second graphical representation.

6. The system of claim 1 further comprising a user input control operable by a user to select the selected graphical element of the first graphical representation, wherein the data-processing system is further configured to detect the selection based on a signal generated by the user input control.

7. A method of graphically representing data, the method comprising:
presenting, in a first display area of a display, a collection of data points corresponding to data generated by one or more computing devices of members of a non-empty set of organizations, wherein each data point in the collection is representative of at least two variables, and wherein the collection of data points is presented in the first area of the display as a scatter plot;
detecting a selection of a first portion of data points in the scatter plot, the selection being indicated by a selection window superimposed on the scatter plot; and
presenting, in a second display area of the display, a first graphical representation of the organizations, wherein the first graphical representation includes a plurality of graphical elements in which each graphical element in the plurality corresponds to one or more data points in the collection of data points, and wherein each graphical element in the plurality has a size that is determined based on the first portion of data points selected and appearing within the selection window;

wherein the size of each graphical element in the plurality being displayed in the second display area is updated when a selection of a second portion of data points, different from the first portion of data points, in the scatter plot is detected.

8. The method of claim 7 wherein the size is determined further based on i) the number of members of an organization that corresponds to the graphical element, in relation to ii) the total number of members in the set of organizations.

9. The method of claim 7 wherein the first graphical representation is a pie chart having a plurality of slices as graphical elements.

10. The method of claim 7 wherein the first graphical representation is a bar chart having a plurality of bars as graphical elements.

11. The method of claim 7 further comprising presenting, in a third display area of the display, a second graphical representation of a non-empty set of members of the organizations, wherein the first graphical representation includes a plurality of graphical elements in which each graphical element in the plurality corresponds to one or more graphical element segments of the second graphical representation.

12. A system for graphically representing data, the system comprising:
a data-processing system configured to detect a selection of a first portion of data points in a scatter plot that is being displayed, the selection being indicated by a selection window superimposed on the scatter plot, wherein the scatter plot is representative of a collection of data points corresponding to data generated by one or more computing devices of members of a non-empty set of organizations; and
a display configured to:
a) present the scatter plot and selection window in a first display area of the display, and
b) present, in a second display area of the display, a first graphical representation of the organizations, wherein the first graphical representation includes a plurality of graphical elements in which each graphical element in the plurality corresponds to one or more data points in the collection of data points, and wherein each graphical element in the plurality has a size that is determined based on i) the number of members, as represented in the first portion of data points selected and appearing within the selection window, of an organization that corresponds to the graphical element, in relation to ii) the total number of members, as represented in the first portion of data points selected and appearing within the selection window, in the set of organizations;
wherein the display is further configured to update the size of each graphical element in the plurality being displayed in the second display area, when a selection of a second portion of data points, different from the first portion of data points, in the scatter plot is detected.

13. The system of claim 12 wherein the first graphical representation is a pie chart having a plurality of slices as graphical elements.

14. The system of claim 12 wherein the first graphical representation is a bar chart having a plurality of bars as graphical elements.

15. The system of claim 12 wherein the display is further configured to present, in a third display area of the display, a second graphical representation of a non-empty set of members of the organizations, wherein the first graphical representation includes a plurality of graphical elements in which each graphical element in the plurality corresponds to one or more graphical element segments of the second graphical representation.

16. The system of claim 15 wherein the data-processing system is further configured to:
   detect a selection of a selected graphical element of the first graphical representation; and
   transmit a signal to the display to highlight the one or more graphical element segments of the second graphical representation that correspond to the selected graphical element of the first graphical representation.

17. The system of claim 12 further comprising a user input control operable by a user to select the selected graphical element of the first graphical representation, wherein the data-processing system is further configured to detect the selection based on a signal generated by the user input control.

18. A method of graphically representing data, the method comprising:
   presenting, in a first display area of a display, a collection of data points corresponding to data generated by one or more computing devices of members of a non-empty set of organizations, wherein the collection of data points is presented in the first area of the display as a scatter plot;
   detecting a selection of a first portion of data points in the scatter plot, the selection being indicated by a selection window superimposed on the scatter plot; and
   presenting, in a second display area of the display, a first graphical representation of the organizations, wherein the first graphical representation includes a plurality of graphical elements in which each graphical element in the plurality corresponds to one or more data points in the collection of data points, and wherein each graphical element in the plurality has a size that is determined based on i) the number of members, as represented in the first portion of data points selected and appearing within the selection window, of an organization that corresponds to the graphical element, in relation to ii) the total number of members, as represented in the first portion of data points selected and appearing within the selection window, in the set of organizations;
   wherein the size of each graphical element in the plurality being displayed in the second display area is updated when a selection of a second portion of data points, different from the first portion of data points, in the scatter plot is detected.

19. The method of claim 18 wherein the first graphical representation is a pie chart having a plurality of slices as graphical elements.

20. The method of claim 18 wherein the first graphical representation is a bar chart having a plurality of bars as graphical elements.

21. The method of claim 18 further comprising presenting, in a third display area of the display, a second graphical representation of a non-empty set of members of the organizations, wherein the first graphical representation includes a plurality of graphical elements in which each graphical element in the plurality corresponds to one or more graphical element segments of the second graphical representation.

22. The method of claim 21 further comprising:
   detecting a selection of a selected graphical element of the first graphical representation; and
   highlighting the one or more graphical element segments of the second graphical representation that correspond to the selected graphical element of the first graphical representation.

* * * * *